United States Patent [19]

George et al.

[11] Patent Number: 5,774,669
[45] Date of Patent: Jun. 30, 1998

[54] SCALABLE HIERARCHICAL NETWORK MANAGEMENT SYSTEM FOR DISPLAYING NETWORK INFORMATION IN THREE DIMENSIONS

[75] Inventors: Jude George, San Jose; Leslie Schlecht, Ben Lomand; James D. McCabe, Sunnyvale; John LeKashman, Jr., Los Gatos, all of Calif.

[73] Assignee: The United States of America as represented by the Administrator of the National Aeronautics and Space Administration, Washington, D.C.

[21] Appl. No.: 505,723

[22] Filed: Jul. 28, 1995

[51] Int. Cl.[6] .......................... G06F 13/14; G06F 13/00
[52] U.S. Cl. .......................... 395/200.54; 395/200.72; 395/200.79
[58] Field of Search .................. 395/800, 200.01, 395/200.11, 356, 357, 653, 200.47, 200.48, 200.53, 200.54, 200.68, 200.72, 200.73, 200.79, 200.82

[56] References Cited

U.S. PATENT DOCUMENTS

| | | | |
|---|---|---|---|
| 4,253,144 | 2/1981 | Bellamy et al. | 395/200.56 |
| 5,226,120 | 7/1993 | Brown et al. | 395/200.11 |
| 5,261,044 | 11/1993 | Dev et al. | 395/357 |
| 5,295,244 | 3/1994 | Dev et al. | 395/357 |
| 5,307,465 | 4/1994 | Iki | 395/325 |
| 5,367,635 | 11/1994 | Bauer et al. | 395/653 |
| 5,394,522 | 2/1995 | Sanchez-Frank et al. | 395/349 |
| 5,430,729 | 7/1995 | Rahnema | 370/409 |
| 5,481,674 | 1/1996 | Mahavadi | 395/200.54 |
| 5,500,934 | 3/1996 | Austin et al. | 395/326 |
| 5,522,042 | 5/1996 | Fee et al. | 395/200.01 |
| 5,535,403 | 7/1996 | Li et al. | 395/800 |
| 5,544,314 | 8/1996 | Fuchsreiter et al. | 395/200.07 |
| 5,568,605 | 10/1996 | Clooston et al. | 395/182.02 |
| 5,606,664 | 2/1997 | Brown et al. | 395/200.54 |

OTHER PUBLICATIONS

George et al., "The NAS Hierarchical Network Management System", Proceedings of the IFIP TCG/WG6.6 Third International Symposium on Integrated Network Management 18–23, Apr., 1993.

Primary Examiner—Meng-Ai T. An
Attorney, Agent, or Firm—Kenneth L. Warsh; Harry Lupuloff; John G. Mannix

[57] ABSTRACT

A network management system has SNMP agents distributed at one or more sites, an input output module at each site, and a server module located at a selected site for communicating with input output modules, each of which is configured for both SNMP and HNMP communications. The server module is configured exclusively for HNMP communications, and it communicates with each input output module according to the HNMP. Non-iconified, informationally complete views are provided of network elements to aid in network management.

20 Claims, 29 Drawing Sheets

SCALABLE HIERARCHICAL NETWORK MANAGEMENT SYSTEM FOR DISPLAYING NETWORK INFORMATION IN THREE DIMENSIONS

ORIGIN OF INVENTION

The invention described herein was made in the performance of work under a NASA contract and is subject to the provision of Section 305 of the National Aeronautics and Space Act of 1958, Public Law 85-568 (72 Stat. 435; 42 U.S.C. 2457).

BACKGROUND OF THE INVENTION

1. Technical Field of the Invention

This invention relates to systems and methods for hierarchical network management and control.

2. Description of the Prior Art

The implementation of systems for monitoring and/or controlling a computer network are known in the field of networking as a network management system (NMS). Such systems can conventionally be implemented in one or more software programs, or a combination of software and hardware, as is well-known.

It is known that networks are conventionally described by a model known as an Open Software Interconnect (OSI) reference model. According to this model, there as seven layers of activity, beginning from the lowest level: (1) the physical layer, (2) the data link layer, (3) the network layer, (4) the transport layer, (5) the session layer, (6) the presentation layer, and (7) the application layer.

It is further known that large networks are divisible into subnetworks. Typically, traffic (packets) between to hosts on the same subnetwork are restricted to travel on that subnetwork. Traffic between two hosts on different subnetworks will travel across each subnetwork in the path between two endpoints, assuming there exists an actual path. Subnetworks, as is well-known, are joined by devices known as routers, bridges, or gateways. These devices, along with the hosts, are know as nodes on the network.

Further known is that a computer network is typically managed by one or more network administrators. Network administrators (or network managers) have the task of making sure that the network is in an operational state, and that it is performing at a high level of efficiency. The network manager may use a network management system to assist in this task.

It is well known that current network management systems include: (1) a software program, a hardware device, or a combination of hardware and software, (2) information gathering elements effective for gathering information about a selected computer network, and (3) a reporting function which reports information directly to system administrators, or to selected software and/or hardware elements. It is desirable that a network management system further include the following properties: (1) scalability, i.e., the ability to monitor both large and small networks, (2) economic operation, that is, operation without requiring excessive network resources, and (3) able to display its information in a graphical or textual form which is easy to understand, i.e., information is refined beyond mere raw network data form.

Current transmission control protocol/ Internet protocol (TCP/IP) network management systems have many unresolved problems in operation and design. In general, the installation of large, high speed local and wide-area networks, respectively LANs and WANs, has created a network complexity characterized by use of separate management tools for each type of network hardware.

However, no current network management tool is generally workable with all current types of network hardware.

More particularly, current network management tools are not able to retrieve management data from each network device selected for monitoring in the network.

Current network management tools are limited in scalability. Simply stated, current network management tools are limited in adaptability to increases in network size and complexity without (1) becoming overloaded with data, (2) using excessive amanitas of network bandwidth, (3) providing false information due to latency in data flow, (4) requiring substantial user involvement (e.g., manually adding and arranging objects on the display), or (5) an inability to display information without hiding data behind other data.

A known simple network management protocol (SNMP) is currently supported by many vendors of high level network hardware. However, the commercial network management packages available which use this protocol are deficient in scalability.

It is desirable to develop a network management system which is based upon an open, published standard, without relying upon proprietary limitations which may become unavailable or which may change in the future.

It is further desirable to develop a network management system which operates with a distributed architecture, and relies upon existing standards used in current network management.

It is further desirable to display network information at multiple levels, without sacrificing readability. Some known network management systems iconify portions of a network representation, thereby producing a degraded network representation at the expense of accuracy. See for example. U.S. Pat. No. 5,261,044.

It is further desirable to develop a network management system which requires no editing of the displays by the user. Rather, the network management system should enable display and arrangement of information automatically and intuitively, scaling to the size of the network which it is displaying.

It is further desirable to monitor a network having multiple managerial points of control. Conventionally, according to a known approach involving a typical network management architecture, each network site runs a complete network management system. To perform its job, each network management system would contact every single network device according to a simple network management protocol (SNMP) in order to build a representation of the overall network. This results in slightly different network representations at each network station. Further, it generates a great amount of network management traffic. Quantitatively, the total number of polling sessions according to the current state of the art is m*n, where m is the number of management stations and n is the number of managed objects. Thus, if there are 300 devices on the network, there would be almost 15,000 polling sessions between IOMs and SM during the time interval of one polling interval.

Conventionally, the total network message traffic in bits per second, Rt, equals mt*nt*Ps/ts, where ts is the standard network management protocol (SNMP) polling period in seconds, Ps is the number of bits transferred in both directions in a typical SNMP polling event, mt is the total number of management stations, and nt is the total number of managed devices. The size of the average poll datagram for one SNMP variable is approximately 100 bytes, including the headers added by network layers 1–4. Each reply datagram is approximately similarly sized. For a network with 50 management stations, 300 devices, and a polling period of 30 seconds, Rt=80,000 bits per second. On a WAN, this is a significant portion of the total bandwidth. While this traffic is spread over several networks, the likelihood of local bottlenecks at some network management centers.

In particular, the total management traffic at a particular management center is the sum of traffic generated by stations at the particular management center to poll agents at all sites including local sites plus traffic generated by stations at other centers polling agents at that each station. Accordingly, Rc=Rt*mc/mt+Rt*nc/nt, where Rc is the traffic in bits per second localized at a particular management center. Rt is the total network message traffic in bits per second, mc is the number of management stations at a particular center, mt is the total number of management stations, nt is the total number of managed devices, and nc is the number of managed devices at the center. If three of the management stations and 60 of the managed devices were at a particular center, that center would experience 20,800 bits per second of management traffic. The amount of management traffic over a particular data link or physical network can be similarly calculated by determining which management systems place traffic on that medium and which agents they contact through that medium.

SUMMARY OF THE INVENTION

According to the present invention, a network management system includes three tiers of modules. According to particular embodiment of the present invention, each module tier can include software or hardware or combinations of hardware and software. Modules, according to the present invention, reside at selected network nodes. At the bottom tier, according to the present invention, are input output modules (IOMs). A next tier includes a server module (SM). A third tier includes display or user interface modules (UIMs). According to the present invention, data collection is performed by one or more IOMs operating or running at particular network nodes. The network management system according to the present invention, has the addresses of the nodes on the network being managed.

According to the present invention, other nodes on the network are discovered by one or more of the following methods: (1) preprogramming with a list of nodes by the network administrator, (2) passive listening to traffic passing through its own node and observing the source addresses of all or some of the traversing packets, and (3) asking particular nodes on the network for neighbor lists, called routing tables, and then repeating the inquiry to each neighbor of a former neighbor. Having identified all applicable nodes, operation according to the present invention includes listening passively to traffic passing through a local node and selecting information pertinent to network management, and polling selected network nodes, including asking particular nodes for information pertinent to network management, receiving network node responses to the inquiries made, according to particular polling sessions in which message traffic travels to and from the local node conducting polling activities.

According to the present invention, once a node is discovered, it is announced to the server module. The server module maintains a list of all nodes that have been announced to it by IOMs. The server, in turn, announces new nodes to all UIMs participating in the management system. UIMs, according to the present invention, receive information from the server by subscription lists of object about which the UIM wishes to receive data. The subscription list includes associated variables. According to the present invention, subscriptions are filled as to objects and variables only with state changes in variable or object conditions. Subscriptions according to the present invention include SMs, IOMs, and UIMs. Communication according to one embodiment of the present invention accordingly occurs sparingly according to subscription and occurs exclusively when state changes occur as to particular objects or object variables.

According to the present invention, methods are employed for monitoring a computer network including the steps of gathering information about objects in a computer network, transporting the information gathered about these objects through the network, and presenting the information gathered in visually perceptible form. The information gathered is displayed to at least a single network administration, according to one embodiment of the present invention. According to the present invention, a distributed hierarchical network management system (HNMS) is developed which includes several software modules, including at least a server module (SM), acting as a central hub; a user interface module(UIM); and an input/output module (IOM). According to a particular embodiment of the present invention, the distributed HNMS includes additionally at least one of the following, a database module (DM) and a rules-based intelligent processor (RBIP).

The SM collects topology and status information, according to one embodiment of the present invention.

The IOM monitors local hardware objects at backbone and connected leaf sites for selected local area network (LAN) and wide are network (WAN) sites, according to an embodiment of the present invention, and passes filtered management data to an associated SM which in turn sends selected information to the UIMs participating in the HNMS.

The UIM enables access to real-time or logged data and may reside on a graphical workstation, according to one embodiment of the present invention.

UIM, SM, and IOM communication is governed by a hierarchical network management protocol (HNMP) according to one embodiment of the present invention. The HNMP is an open protocol according to ASN.1, an ISO standard data format specification. All data types used internally by and between the modules are ISO data types. Use of the HNMP according to the present invention avoids flooding networks with excessive management traffic and avoids bottlenecks at management information processing locations.

According to one embodiment of the present invention, the SM assigns each IOM a domain of subnets of networked devices to monitor by standard network management protocol (SNMP) or by Internet control message protocol (ICMP), while additionally promiscuously monitoring local Ethernet for indications of device up and functioning status according to low level protocol analysis to establish a low cost network map. SNMP communications provide detailed device information, permitting only device state change message traffic between IOM and SM.

According to the present invention, the SM provides UIMs with information selected according to predetermined subscription terms, specifying selected network objects and particular variables following ASN.1 syntax for variable types SNMP and HNMP management information base (MIB).

According to the present invention, a UIM readably displays leveled network details and state changes at all levels from WAN to device level, and provides traffic studies, network performance data, logged trouble tickets, and cross reference data to other UIMs for tracking cross network problems by multiple system administrators, as well, according to a particular embodiment.

According to the present invention, the UIM configures information automatically. The user needs only to specify the type of the display, the selection of objects to be drawn, and the variables to be presented. The positions of the objects on the screen relative to each other are determined without user involvement.

The data base module (DBM) according to the present invention is the situs for logging long term traffic studies and to maintain current network state data for server crash, unavailability, and congestion contingencies.

The RBIP module according to the present invention is an expert system which makes decisions about HNMS parameters based on overall network traffic and usage, responding to SM inquiries for automatic adjustment of polling intervals and for network load forecasts, both long and short term.

According to the present invention, a network having multiple managerial points of control is accurately monitored with a canonical representation including network statistics. In particular, according to the present invention, with a single IOM operating under HNMS, being polled n times, which is the number of objects being managed. There will be n' HNMP sessions between the IOMs and the SM. Each UIM maintains a session with the SM to receive management information, involving m sessions where u is the number of UIMs. Accordingly, the total number of sessions according to the present invention, is m+n'+n, rather than m*n, as per the prior art, a clearly much lower value for large m, n, and n'.

According to the present invention, the HNMS uses strategically located server and IOMs to distribute management information within selected bounds to limit the volume of network message traffic and to eliminate a high probability of network overloads.

According to one embodiment of the present invention, a network management system has SNMP agents distributed at one or more sites, an IOM at each site, and a SM located at a selected site for communicating with IOMs, each of which is configured for both SNMP and HNMP communications. The SM is configured exclusively for HNMP communications, and it communicates with each IOM according to the HNMP.

The HNMS according to the present invention is cost effective and fault tolerant. Multiple points of network management control ensure that some portion of the IOS will remain up to collect data and service UIM requests. If a particular IOM should fail or become unreachable, its management domain is assigned to another IOM, according to the present invention.

According to the present invention, if a server should fail, another server will be spawned from the pool of IOMs.

According to one embodiment of the present invention, all nodes of a particular network are simultaneously displayed. According to one embodiment, subnets are displayed as horizontal nodes and hosts are displayed as vertical columns. Interfaces are represented at particular intersections of rows and columns. Using such a display method, all hosts and interfaces on a network are representable without iconification.

According to another embodiment of the present invention, subnets are represented as concentric rings, with the hosts arrayed radially. Interfaces are located at the intersection of rings and radii. Accordingly, all hosts and interfaces on a network can be represented on a single diagram, which in this case is circular.

According to another embodiment of the present invention, multiple OSI reference model layers are displayed three dimensionally. Finally, according to yet another embodiment of the present invention, the third OSI reference model layer is displayed with routing information indicating packet paths between nodes in a network, with arrows, for example, indicating packet flow direction.

DETAILED DESCRIPTION OF THE INVENTION

Figure 1A:
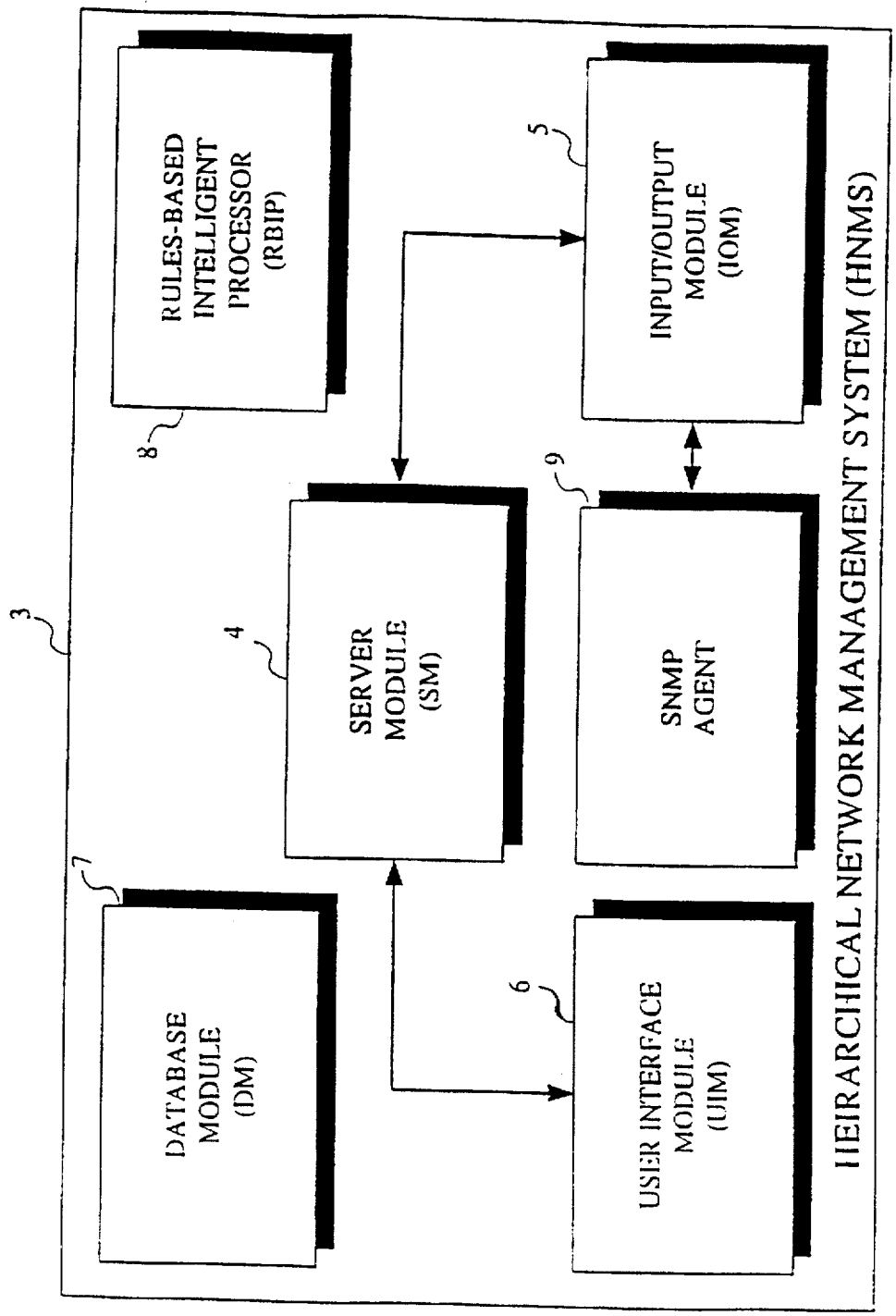
FIG. 1a is a block diagram of a hierarchical network management system (HNMS) according to the present invention including at least a server module (SM), acting as a central hub: a user interface module(UIM); an input/output module (IOM); a database module (DM); and a rules-based intelligent processor (RBIP)

FIG. 1a is a block diagram of a hierarchical network management system (HNMS) 3 according to the present invention including at least a server module (SM) 4, acting as a central hub; an input/output module (IOM) 5; a user interface module(UIM) 6; a database module (DM) 7; a rules-based intelligent processor (RBIP) 8; and an SNMP agent 9. According to the present invention, SNMP traffic is conducted between SNMP agent 9 and IOM 5, and HNMP traffic is conducted between IOM 5 and SM 5 and between SM 5 and UIM 6.

Figure 1B:
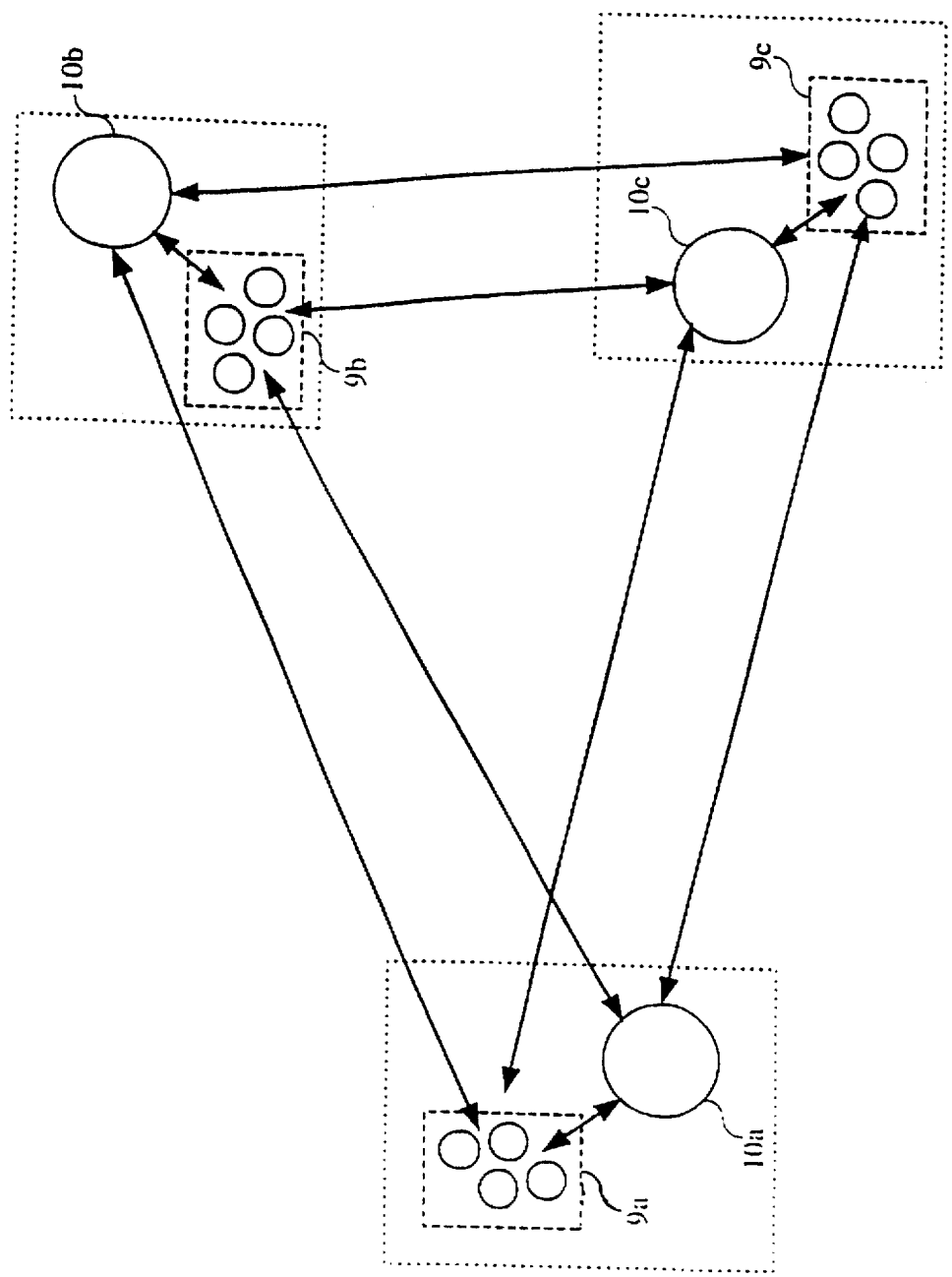
FIG. 1b is a diagram of a known network management system (NMS) including three server modules (SMs) and corresponding three sets of SNMP agents, each of the SMs communicating with each of the SNMP agents.

FIG. 1b is a block diagram of a conventional network management system (CNMS) 3 including first, second, and third management stations 10a–10c each individually communicating with each of SNMP agents 9a–9c. First management station 10a and SNMP agents 9a are located at a third network site. Second management station 10b and SNMP agents 9b are located at a second network site. Third management station 10c and SNMP agents 9c are located at a first network site. SNMP traffic is conducted directly between any of management stations 10a–10c and any of SNMP agents 9a–9c, resulting in the potential for high levels of message traffic.

Figure 1C:
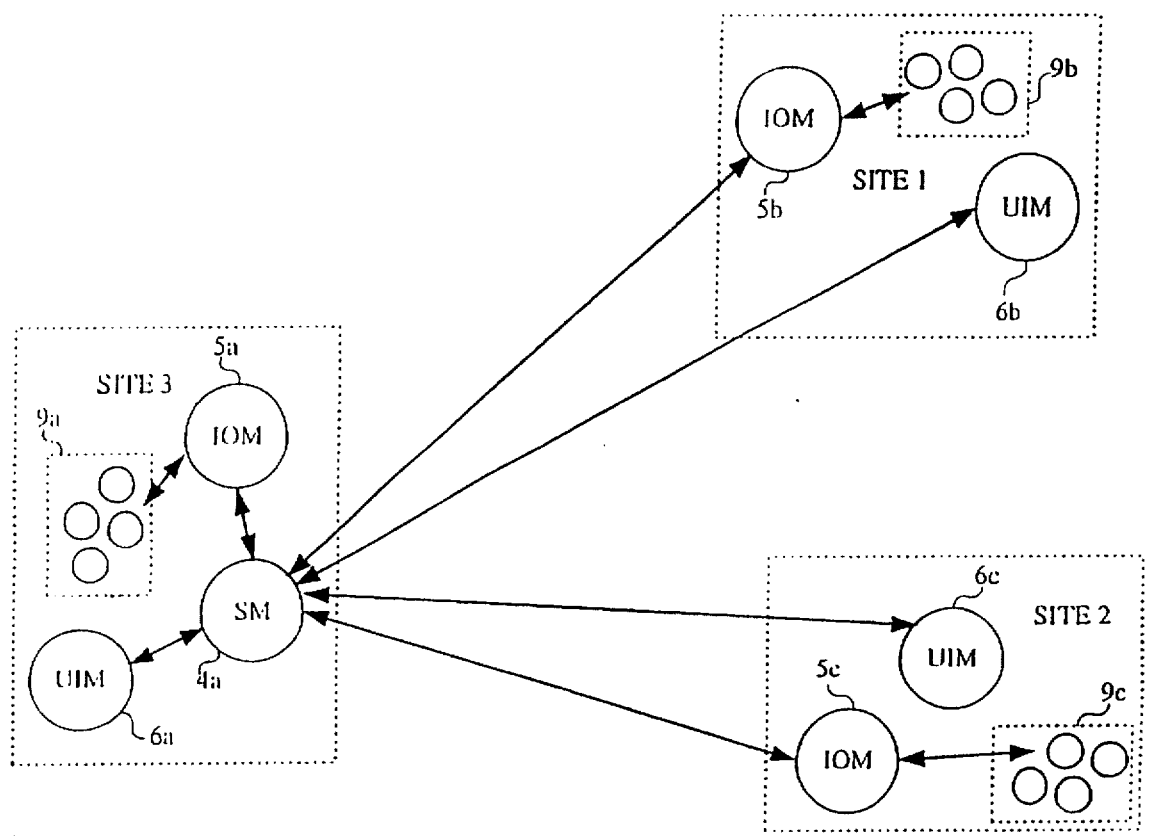
FIG. 1c is a diagram of a hierarchical network management system (HNMS) according to the present invention including a server module (SM) acting as a central hub; three user interface modules (UIMs); corresponding three input/output modules (IOMs); and corresponding three sets of SNMP agents, each SNMP agent communicating with its associated IOM.

FIG. 1c is a block diagram of a hierarchical network management system (HNMS) 3 according to one embodiment of the present invention including at single server module (SM) 4, acting as a central hub at a selected third site; first, second, and third input/output modules (IOMs) respectively 5a–5c; and first, second, and third user interface modules (UIMs) respectively 6a–6c. According to the present invention, SNMP traffic is conducted between SNMP agents 9a and IOM 5a, between SNMP agents 9b and IOM 5b, between SNMP agents 9c and IOM 5c; and HNMP traffic is conducted between IOMs 5a–5c and SM 5 and between SM 5 and UIMs 6a–6c. According to the present invention, SNMP traffic from a given agent stops ant the most local IOM. The information is processed locally, and only state changes are passed up to the server through HNMP. Thus, HNMP traffic is always less than the corresponding SNMP traffic from a given set of agents. From the server, information about a particular network object is passed only to those UIMs that are subscribed to that object. Each UIM receives information about the state changes in the entire network, the level of detail about a particular set of objects is user selectable.

More particularly, the amount of management traffic according to the present invention is Rs=Is+Us, where Is is the traffic between server and IOM at site s, and Us is the traffic between server and UIMs at site s. The total amount of management traffic on the backbone is Rb+sum(Rs) for all s. The total amount of management traffic flowing through the local network at a given site s is Ss=As+Us, where As is the traffic between IOM and SNMP agents at site s. The total amount of management traffic generated by HNMS is Rt=Rb+sum(As) for all s.

For a wide area network according to the present invention, SNMP data does not travel over the backbone. Instead, it is localized to the backbone site where the IOM resides and to the leaf sites which are connected to that site. The backbone management traffic consists entirely of HNMP. The management traffic at the location of the server amounts to the sum of all HNMP traffic. The management traffic at a given non-server site is the sum of the SNMP traffic plus the HNMP traffic required to support UIMs at that site. IOM HNMP traffic is not included in that sum, because the IOM is on the isolation LAN at the edge of the network. IOM to server communications goes over the long-haul link. Accordingly, As=ns*Ps/ts; Is=ns*Pi/ti; and Us=ms*Pm/tm; where ts=SNMP polling period in seconds; ti=average interval between IOM HNMP updates to the server, i.e., due to a state change in a particular device;

tm=average interval between server HNMP updates to a give UIM, i.e., due to a state change in a particular device; Ps=bits transferred (in both directions) in a typical SNMP poll; Pi=bits transferred in a typical HNMP message from an IOM to the server; Pm=bits transferred in a typical HNMP message from the server to an UIM; ms=number of UIMs at site s; and ns=number of managed devices at site s. The ti and tm factors are variable depending on the amount of change which occurs in the network. During periods of high fluctuation of the state of network devices, the IOMs may have higher amount of data to report to the server, and likewise the server to the user interfaces. The size of an HNMP message can, in turn, vary. State data for a number of network devices may be queued up and sent in one HNMP message. This is a parameter that can be set by the user, or left for the server to decide. In a worst case scenario, if the state of every network object were to change during an SNMP polling period, and all HNMS modules were to send state data for each network device in a separate HNMP datagram, R for HNMS is approximately equal to R for a conventional NMS. More typically, the state of a network device changes, on the average, once every 1800 seconds. The ratio of ti to is approximately 60 in this case. For the sake of simplicity, assume that a separate HNMP datagram is used for every object. This gives HNMP the same overhead cost per object as SNMP. Further, assume that the UIM at the particular side receives information as detailed as the IOM sends out. Using the example site from the conventional NMS, the average amount of traffic placed on the WAN backbone is Rb=Is+Us=107 bits per second.

If this message traffic were traveling over a 1.544 Kbps backbone T1 serial link, it would only represent 0.007% of the bandwidth of the circuit, as opposed to 1.35% in the case of a conventional network management system. According to the present invention, the cost of a backbone T1 serial link is approximately $960,000 per year. The cost of transporting management information for this single site would be $67 instead of $12,960.

The HNMS according to the present invention is cost effective and fault tolerant. Multiple points of network management control ensure that some portion of the IOS will remain up to collect data and service UIM requests. If a particular IOM should fail or become unreachable, its management domain is assigned to another IOM, according to the present invention. If the IOM is still running, it will continue to gather data to be reported when it reestablishes contact with the server. If the server should fail, another server will be spawned from the pool of IOMs.

In the event of a network catastrophe at a particular site, HNMS does not place additional management traffic on the local network where the problem occurs. For example, if an Ethernet becomes swamped with traffic in the management domain of a particular IOM, and 50 machines are intermittently unreachable, the IOM would have to inform the server of at least 50 state changes. This traffic goes directly from the IOM to an isolation LAN and through T1 to a designated site. This traffic does not load down the local user network and aggravate the local problem.

According to the present invention, HNMS is implemented as a standards-based NMS architecture. It is built upon standard Internet IP, TCP, UDP, SNMP, and 802.3/ Ethernet. HNMS also defines a new MIB for the exchange of high level management information. Objects in this MIB are exchanged using HNMP rather than SNMP. HNMS according to the present invention treats the entire managed network as one tree of objects, whereas SNMP treats each network device as a distinct object with its own MIB tree.

Managing several object data structures of this type is problematic with larger networks. Four hierarchical levels are employed in the HNMS according to the present invention: the device agent level, the OM level, the SM level, and the UIM level.

The HNMS according to one embodiment of the present invention includes a server and IOMs running on Sun and SGI Iris platforms, with the UIM running on Iris. According to one embodiment of the present invention, the HNMS system is implemented in C and LISP. Polling is performed in SNMP on both systems. Promiscuous Ethernet monitoring is accomplished on the Iris platform. According to another embodiment of the invention, HNMS is implemented in C and is portable to any UNIX system with a Berkeley sockets library. Additionally, the HNMP is built upon several ISO standards including ASN.1 for the protocol and data type specification and ISODE for the binary encoding. HNMP falls at Level 5 of the OSI networking stack. The UIM employs an X11 protocol for displays, according to one embodiment of the present invention. According to one embodiment of the present invention, the HNMS includes a server, database, and RBIP modules running on a two-processor Silicon Graphics Iris 4D/320 host.

Figure 2A:
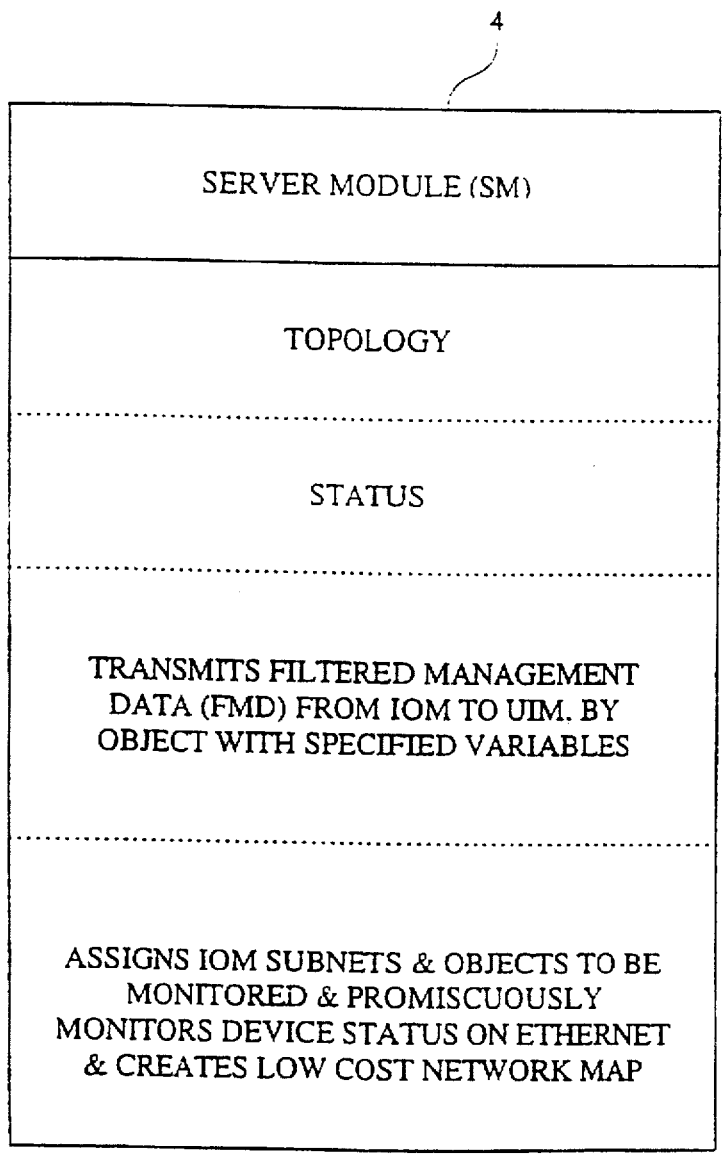
FIG. 2a is a table expressing characteristics of a SM according to the present invention, which indicates key functions of the SM including but not limited to collecting topology and status information.

FIG. 2a is a table expressing characteristics of SM 4 according to the present invention, which indicates key functions of SM 4 including but not limited to collecting topology and status information. Further, SM 4 transmits filtered management data (FMD) from IOMs to UIMs for each object according to specified variable. Additionally, SM 4 assigns subnets and objects to IOMs for monitoring, and SM 4 further monitors device status on Ethernet and creates a low cost network map therefrom. SM 4 is the final authority on object creation, and accordingly does now permit creation of duplicate objects, from either the same module or separate modules. The rules for determining duplicates depend upon definitive variables in object announcements. SM 4 creates objects on its own, according to the present invention, based upon information it has gathered about Internet protocol addresses. In particular, the Internet, Network, and Subnet objects are created by SM 4.

Figure 2B:
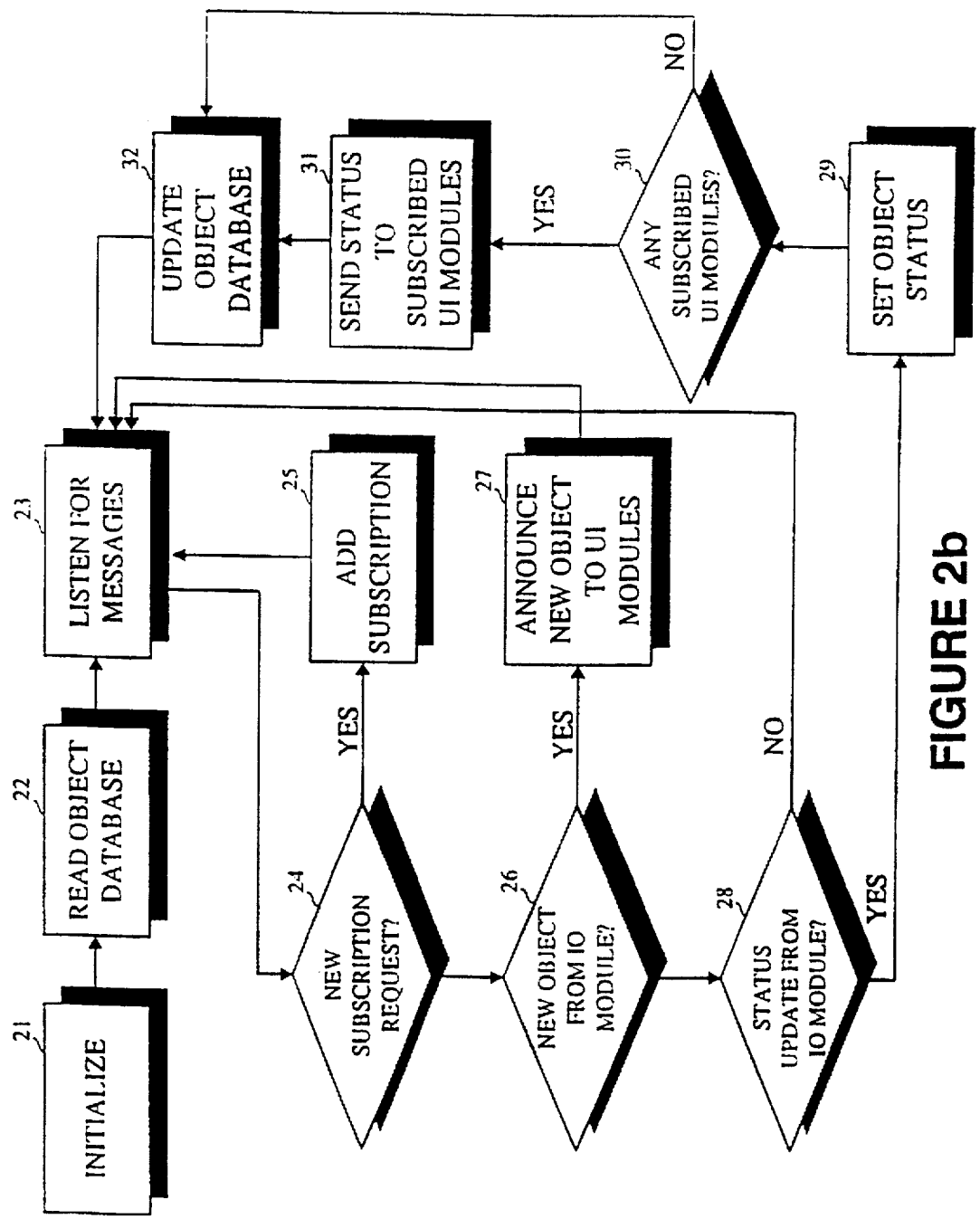
FIG. 2b is a server module flow chart, describing SM operation according to the present invention.

FIG. 2b is a server module status flow chart, describing SM 4 operation according to the present invention. In particular, SM 4 initializes 21 for operation to begin. Next, SM 4 reads 22 its object database. Then, SM 4 listens 23 for messages from associated IOMs 5 and UIMs 6. One such message may be an announce message from an IOM 5 Once SM 4 receives an announcement about an object, it checks the object's definitive variables against those of all of the objects it currently knows about. If the object appears to be unique, SM 4 assigns it a permanent HNMS id and allows the object to be released to other modules. It immediately sends the object back to the announcing IOM 5, which replaces its temporary object with the one created by the server. From that point onward, SM 4 receives information about the particular object through the use of a Subscribe-Data message. A subscription includes an HNMS id and a list of variables which the server would like the IOM 5 to fill in. Each variable binding includes a name:value pair and a timestamp. The HNMS objects and their object data are sent back to the server in SendData messages. A subscription is filled only when the value of a subscribed variable changes. Furthermore, only the changed variables are reported back to subscribing modules. If SM 4 subscribes to 30 variables concerning an object and three of them change within a particular time window, only those three variables will be reported.

SM 4 next determines 24 whether it has received any new subscription requests. If yes, a new subscription is added 25, and listening 23 for messages continues. If no new subscription request has been received 24, then a determination is made 26 whether a new object has been received 26 according to the IOM 5. If yes, an announcement is made 27 of the new object to all UIMs 6. If no new object has been received 26, a check is made 28 whether a status update has been has been received from an IOM 5. If not, then operation continues with listening 23 for messages. Otherwise, if a status update has been received from an IOM 5, the object status is set 29. Next, a check is conducted 30 whether any UIMs 6 have subscribed for information with respect to the particular object. If yes, the status of the particular object is sent 31 to each subscribing UIM 6. Then, the object database is updated 32. Otherwise, is there is no subscribing UIM 6 for the particular object, the object database is updated 32 without any status indications being sent to any UIM 6. Finally, after the object database has been updates 32, operation continues with listening 23 for messages.

Figure 3A:
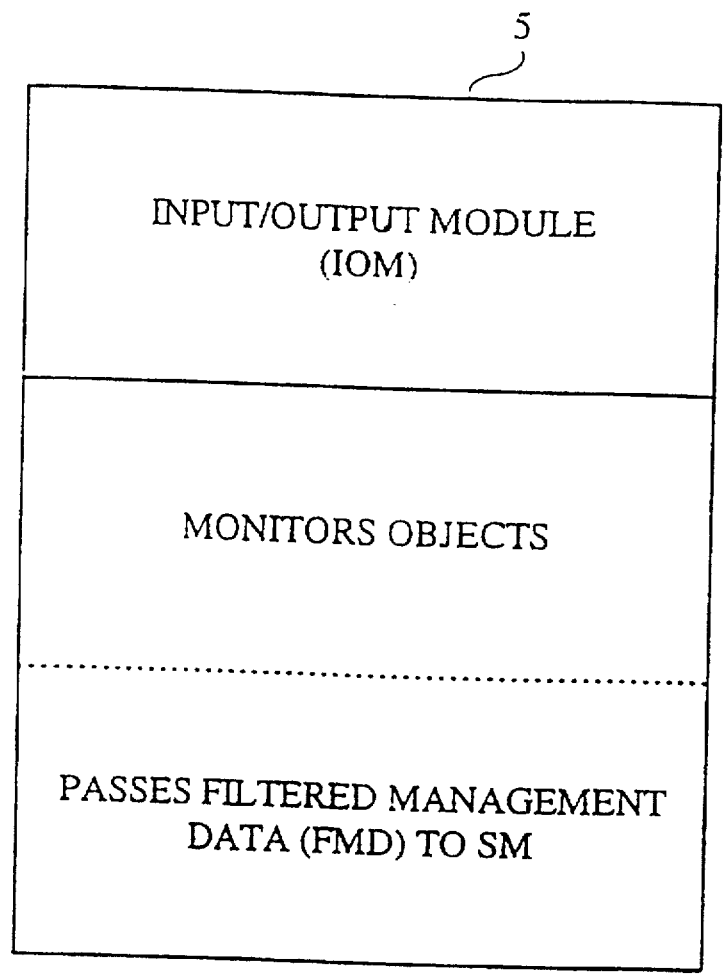
FIG. 3a is a table expressing characteristics of an IOM according to the present invention, which indicates key functions of the IOM including but not limited to monitoring local hardware objects at backbone and connected leaf sites of a selected local area network (LAN) and wide are network (WAN) sites, and passing filtered management data to an associated SM which in turn sends selected information to the UIMs participating in the HNMS according to the present invention.

FIG. 3a is a table expressing characteristics of IOM 5 according to the present invention, which indicates key functions of the IOM 5 including but not limited to monitoring local hardware objects at backbone and connected leaf sites of a selected local area network (LAN) and wide are network (WAN) sites, and passing filtered management data to an associated SM 4 which in turn sends selected information to the UIMs 6 participating in the HNMS according to the present invention. IOM 5 sends announcements about interface, processor, LAN, and link objects.

Figure 3B:
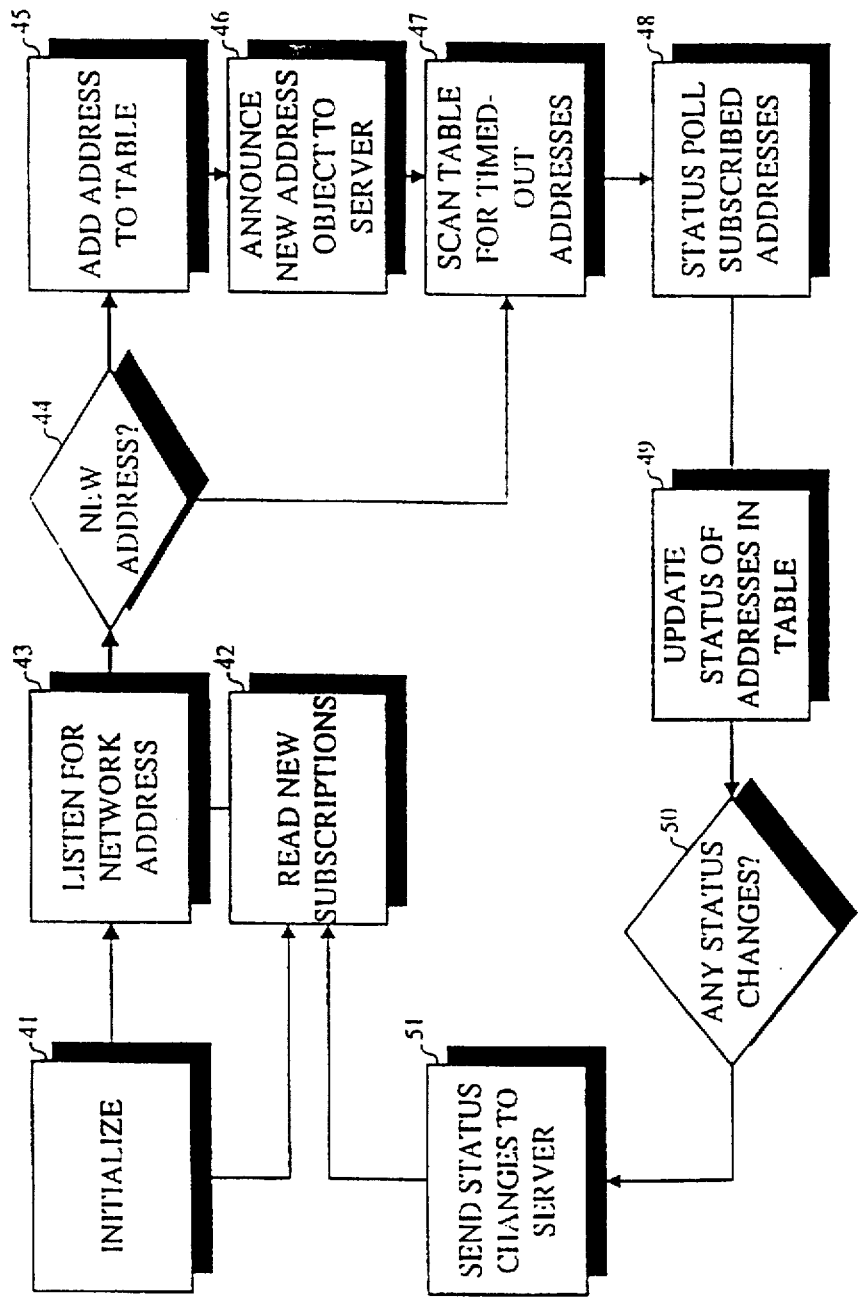
FIG. 3b is an input/output module flow chart, describing IOM operation according to the present invention.

FIG. 3b is an input/output module status flow chart, describing IOM 5 operation according to the present invention. In particular, IOM 5 initializes 41 for operation to begin. Next, IOM 5 reads 42 whether there have been any new subscriptions. Then, IOM 5 listens 43 for any network addresses. IOM 5 next determines 44 whether it has received or discovered any new addresses. If yes, a new address is added 45 to an address table, and an announcement of a new address object discovered is made 46 to the SM 4 by an announce message.

According to FIG. 3b, the announce message made 46 includes an indication of the object or element discovered and a set of object data. The variables used in the announcement are known as definitive variables since they define the object. The definitive variables represent the minimal set of variables required to distinguish the object from other objects of its class. Examples of definitive variables for an interface object are its Internet protocol address and its layer 2 (i.e., Ethernet) address. Other variables known as descriptive variables providing incidental information include the SNMP variables ifInOctets and ifOutOctets.

Then, according to FIG. 3b, the table is scanned 47 for timed-out addresses. Otherwise, is no new address has been received 44, no address is added to the address table, and the table is simply scanned 47 for timed out addresses. Then, a status poll is made 48 of subscribed addresses. Further, the status of addresses in the table is updated 49. A check is then made 50 whether the status of any addresses has changed. If so, the status changes are sent to SM 4. Then, a reading is done 42 for any new subscriptions. If there had been no status changes 50, then no status changes will have been sent to SM 4. Instead, a reading would have been held 42 for new subscriptions without any status changes having been sent to SM 4.

Figure 4A:
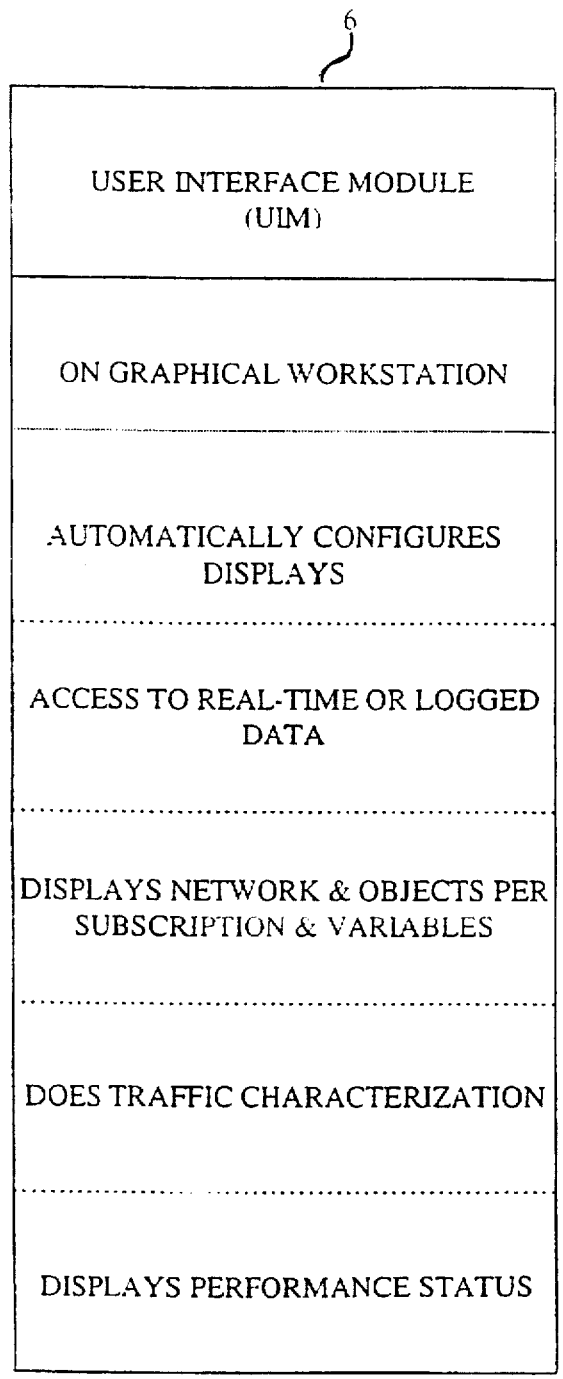
FIG. 4a is a table expressing characteristics of a UIM according to the present invention, which indicates key functions of the UIM including but not limited to accessing real-time or logged data and residing on a graphical workstation.

FIG. 4a is a table expressing characteristics of a UIM 6 according to the present invention, which indicates key functions of the UIM 6 including but not limited to accessing real-time or logged data and residing on a graphical workstation. UIM 6 additionally automatically configures the display. UIM 6 further displays network and object information according to subscriptions and subject to specified variables. According to one embodiment of the present invention, UIM 6 performs traffic characterizations, and further displays network performance status. According to the present invention, each object or element of the network is presented individually, not iconified as a group, possibly causing misleading suggestions about status of the object or element. According to the present invention, an automatically generated, accurate display of objects, elements, and the general operability of the network or a subnetwork, as a whole, is produced by UIM 6, as well as information about operational events and problems for the network administrator. The UIM 6 further provides detailed information about specific network objects or elements, by providing access to SNMP management information base (MIB) variables. These variables include system and device status information, performance statistics, and configuration parameters. MIB variables are defined by specifying syntax, access, status, and description. Syntax is the datatype for the variable, such as integer or string of characters. Access is the permission level, which may be read-only, read-write, write-only, or not-accessible. Status defines whether the variable is mandatory, optional, or obsolete, provided the variable is in a category that has been included in the element's MIB. Description is a text statement describing the variable. Site, Administrator, PostalAddress, and Equipment objects are created by network administrators at UIM 6. Once an object is created, it is announced to all UIMs 6. UIMs 6 also retrieve information by means of subscriptions. A UIM 6 will choose some subset of the set of announced objects based upon what a user wishes to monitor, and subscribe to certain variables regarding these objects. A UIM 6 may further cancel variables in a subscription, or the entire subscription, with an UnsubscribeData message.

According to one embodiment of the present invention, UIM 6 produces four types of status diagrams, each representing the state of a network element by color, for example. These diagrams are updated from the server as element status values change. When a new element is discovered, it is added to the status diagram. Aside from object state, other useful information such as routing paths and response times may be displayed.

One status diagram producable with UIM 6 according to the present invention is a wide area network (WAN) status diagram, which depicts the state of a network and its routers over a geographical reference region such as a map of the U.S., for example. Routers at the same site are clustered together in such a status diagram, and care is taken not to obscure the representation on one router with that of another router. In such a status diagram, the routers are represented by dots, and the links between the routers are represented by lines.

Another status diagram producable at UIM 6 according to the present invention is a site diagram, which can be produced by selecting a site on a WAN diagram. Such a site diagram represents all LANs that are connected to the routers at a given site. According to one embodiment of a site diagram, all interfaces are displayed in the site diagram. The LANs are shown as concentric rings with their interfaces represented as dots, and selected hosts and routers are placed on the peripheries. Such a representation is polar and this approach produces a compact centralized representation for the viewer.

According to another embodiment of the present invention, a custom diagram is produced at UIM 6 permitting the user to construct a custom diagram with any set of network elements selected. According to this embodiment, when a network is requested, individual subnets within a network will appear when they are announced by the server. Alternatively, the user may ask for individual subnets by name, and only those subnets will be displayed.

According to another embodiment of the present invention, UIM 6 produces an object diagram, which is a textual display of an elements variables, which is updated when the element changes. The object diagram is the lowest level diagram displayed according to a hierarchical embodiment of the present invention.

Additionally, according to the present invention, real-time performance diagrams are produced for visualizing network variables in trouble-shooting and analysis. These real-time performance diagrams are updated at selected or regular intervals. Such displays, according to one embodiment, take the form of histograms for instantaneous single-element observation, line graphs for historical single-element observation, and an adaptation of a site diagram for multi-element observation.

According to one embodiment of the present invention, an element's operational state is represented by one of four colors. Magenta indicates an unknown operational state. Green indicates a responsive operational state. Red indicates an unreachable operational state. Yellow indicates a non-responsive operational state. Further, white is a neutral color user for display of text. Finally, orange is used to indicate routing paths.

Further according to one embodiment of the present invention, UIM 6 produces an indication of network administrative state. One administrative state is normal, indicating no problems. Another administrative state is the unresolved problem state, indicating an unresolved problem. Another administrative state is the alarm state, indicating an alarm condition of the network in which an operational state change to unreachable has been attained, which results in a signal to the network operator.

If an alarm state is reached, the operator selects the object having the alarm state and request SM 4 to change the state of the object to unreachable, thereby flagging the condition of the particular object. SM 4 then validates the request and forwards the state change to the other UIMs, thus informing other interested parties. When the problem is resolved, the operator again selects the particular element an requests a change of status to normal be entered and asks that the flag be removed. Then, the server informs all applicable UIMs 6 of the state change back to normal.

Figure 4B:
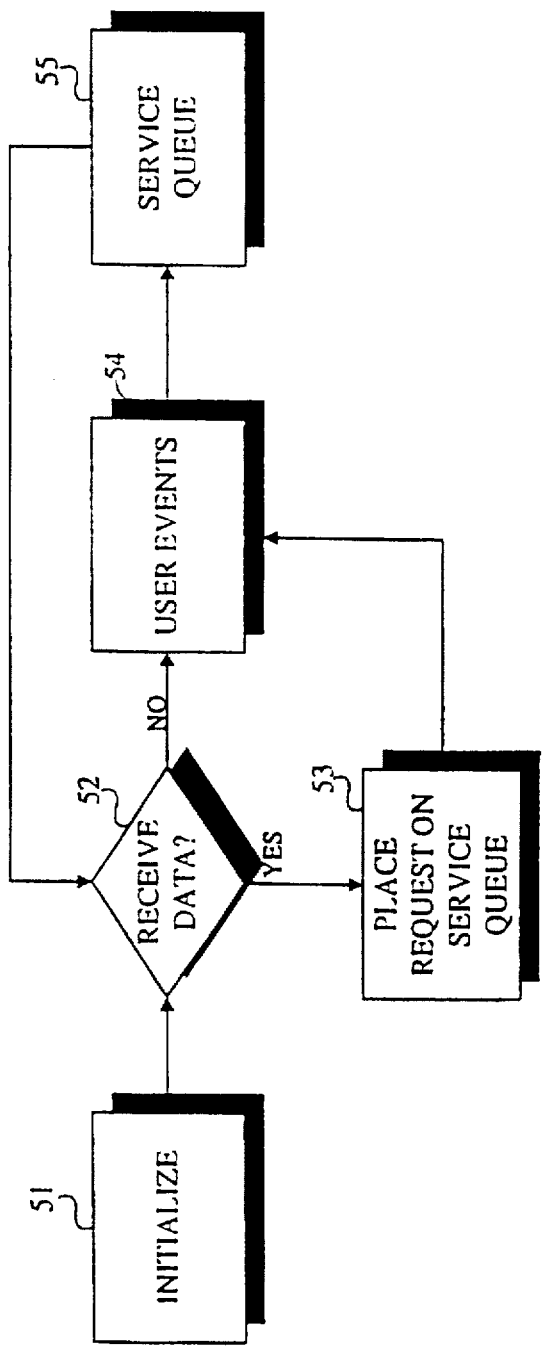
FIG. 4b is a user interface module flow chart, describing UIM operation according to the present invention.

FIG. 4b is a user interface module status flow chart, describing UIM 6 operation according to the present invention. In particular, UIM 6 initializes 21 for operation to begin. Next, UIM 6 checks 52 whether it has received any data. If it has received data, UIM 6 places a request 53 on a service queue, and then performs 54 certain user events. If no data has been received, certain user events are performed 54 without a request being placed 53 on the service queue. After user events have been performed 54, service queue operations are performed 55. When the service queue operations have been performed 55, operation continues with a check on whether data has been received 52.

Figure 4C:
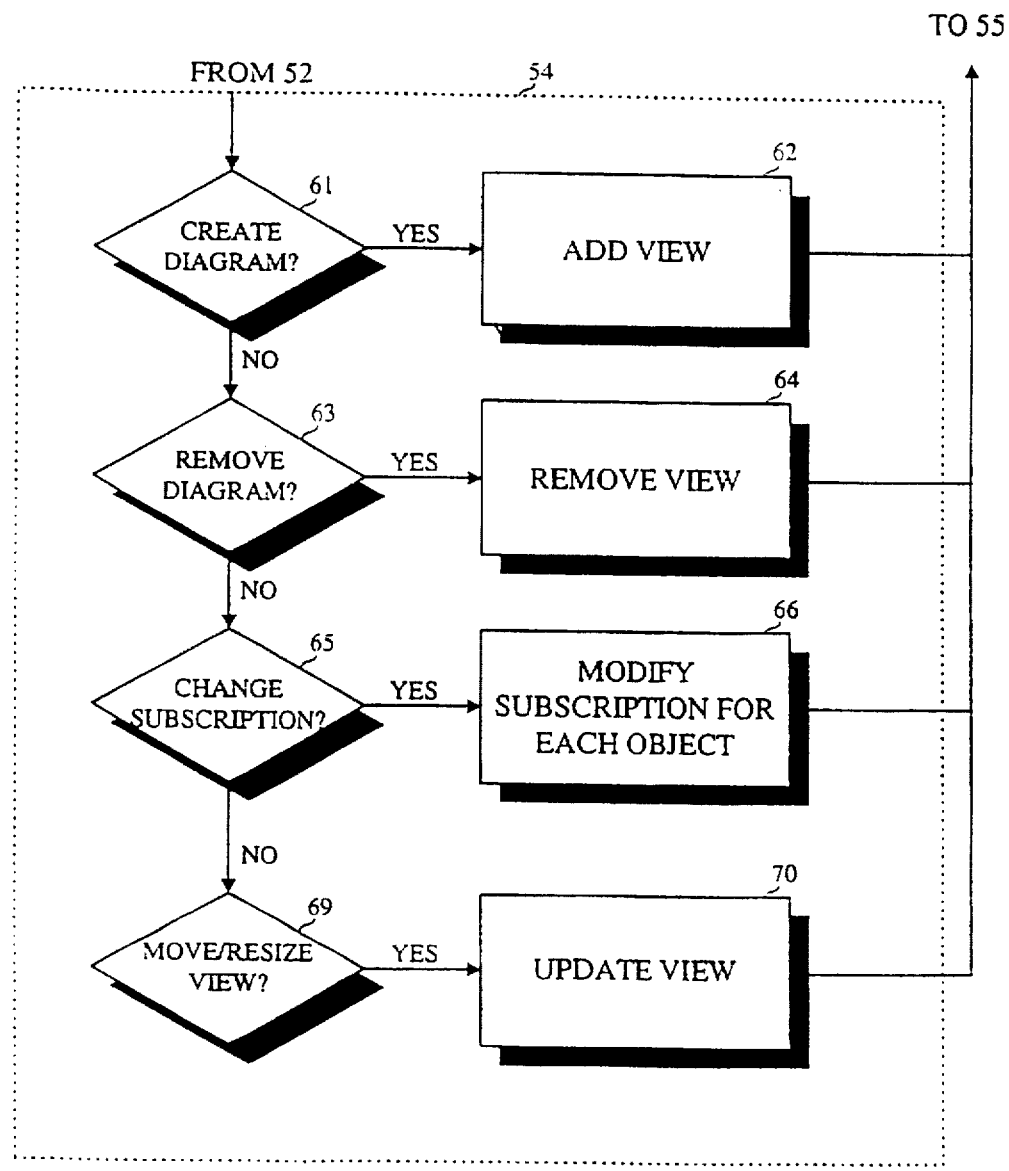
FIG. 4c is a flow chart showing user event steps according to the present invention.

FIG. 4c describes a portion of UIM 6 operation according to the present invention. In particular, FIG. 4c is a flow chart of user events which are performable as step 54 of FIG. 4b. In particular, the user events include checking 61 whether to create a vie, and if so adding 62 the view on the service queue for each object to be created; checking 63 whether to remove a view, and if so removing 64 the view; checking 65 whether to change a subscription, and if so modifying 66 the subscription for each applicable object in the view; and checking 69 whether to move or resize a view, and if so moving or resizing 70 the applicable display 70.

Figure 4D:
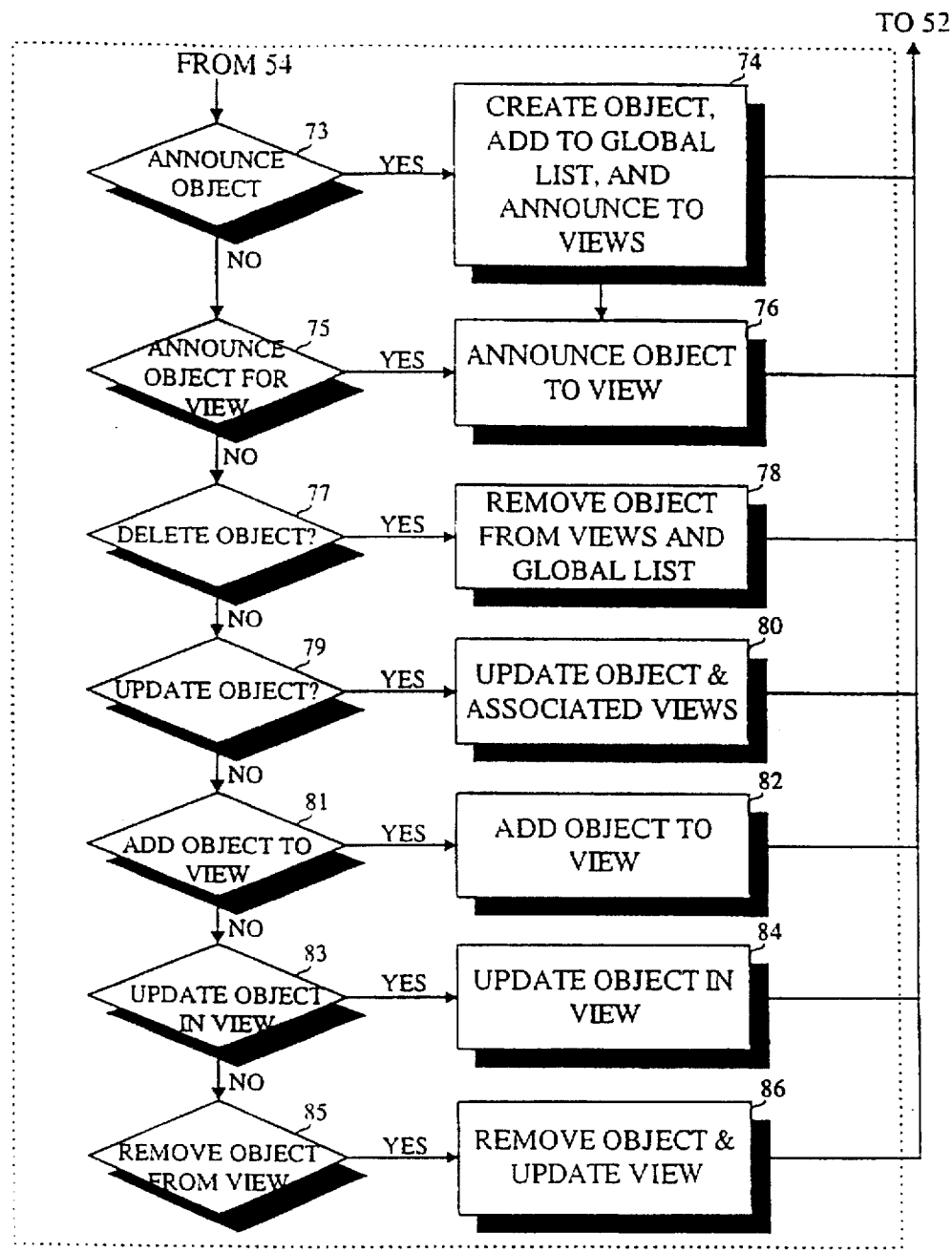
FIG. 4d is a flow chart showing service queue events according to the present invention.

FIG. 4d is a flow chart of service queue events which are performable as step 55 of FIG. 4b. In particular, the service queue events include checking 73 whether to announce an object, and if so creating the object, adding the object to a global list, and announcing 74 the object to each of the views; checking 75 whether to delete an object, and if so removing 76 an object from each of the applicable views and the global list; checking 77 whether to update an object and if so updating 78 the object and each of its associated views: checking 79 whether to add an object to a view, and if so adding 80 the object to each applicable view; and checking 81 whether to remove an object from a particular view, and if so removing the object and updating 82 the applicable views.

Figure 5:
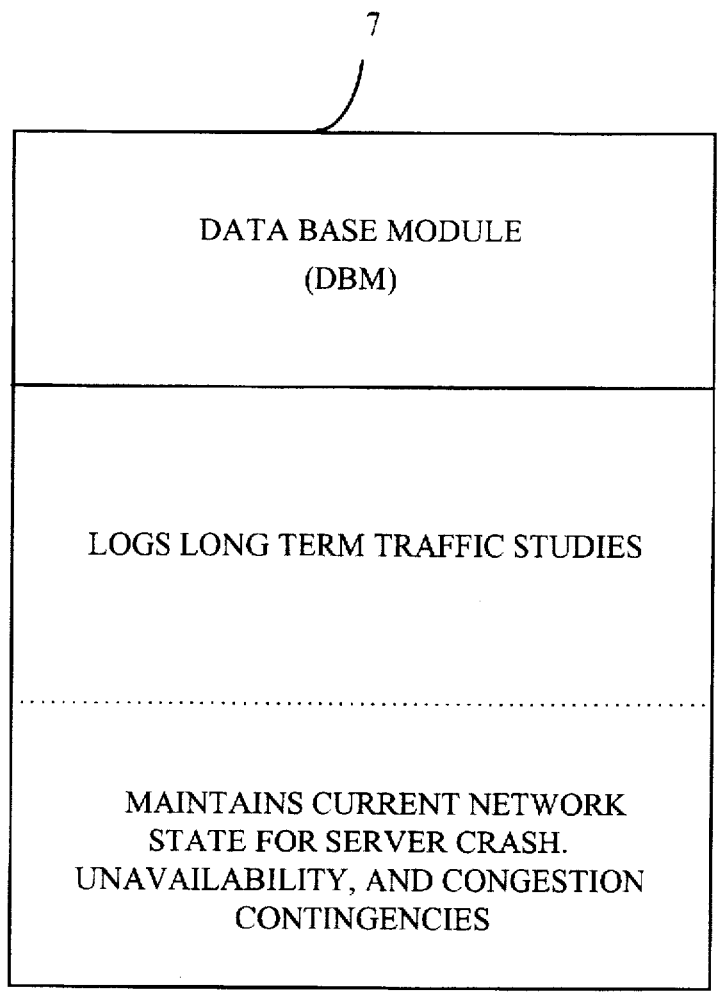
FIG. 5 is a table expressing characteristics of a DBM according to the present invention, which indicates key functions of the DBM including but not limited to logging long term traffic studies and to maintaining current network state data for server crash, unavailability, and congestion contingencies.

FIG. 5 is a table expressing characteristics of a DBM 7 according to the present invention, which indicates key functions of the DBM 7 including but not limited to logging long term traffic studies and to maintaining current network state data for server crash, unavailability, and congestion contingencies. According to one embodiment of the present invention, a structured query language (SQL) data base engine is employed to convert HNMP messages to SQL commands. According to one embodiment of the present invention, DBM 7 and SM 4 are located on separate servers, to permit one to serve as a back-up for the other, in the event that one server is down. The DBM 7 is used for active data and inactive data. In one instance, DBM 7 maintains up-to-date working information, including a set of tables containing records about HNMS objects. Each record is identified and indexed through an HNMS ID. This data is maintained at a fail-safe location, in case the HNMS server moves, or terminates unexpectedly, and needs to quickly recover its state. In addition, inactive data is information which does not represent the current state of the network, but which is nonetheless useful for long term analysis or simply for maintaining a historical record of network activities.

Figure 6:
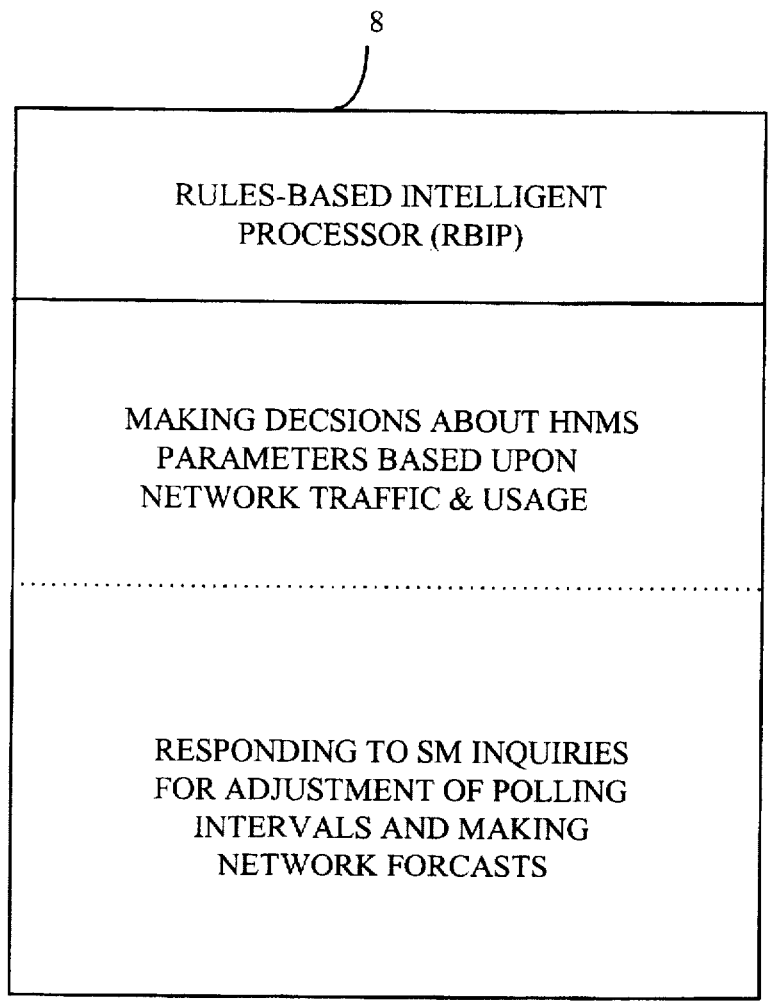
FIG. 6 is a table expressing characteristics of RBIP module according to the present invention, which indicates key functions of the RBIP module including but not limited to making decisions about HNMS parameters based on overall network traffic and usage, responding to SM inquiries for automatic adjustment of polling intervals and making network load forecasts, both long and short term.

FIG. 6 is a table expressing characteristics of RBIP module 8 according to the present invention, which indicates key functions of the RBIP module 8 including but not limited to making decisions about HNMS parameters based on overall network traffic and usage, responding to SM 4 inquiries for automatic adjustment of polling intervals and making network load forecasts, both long and short term.

Figure 7A:
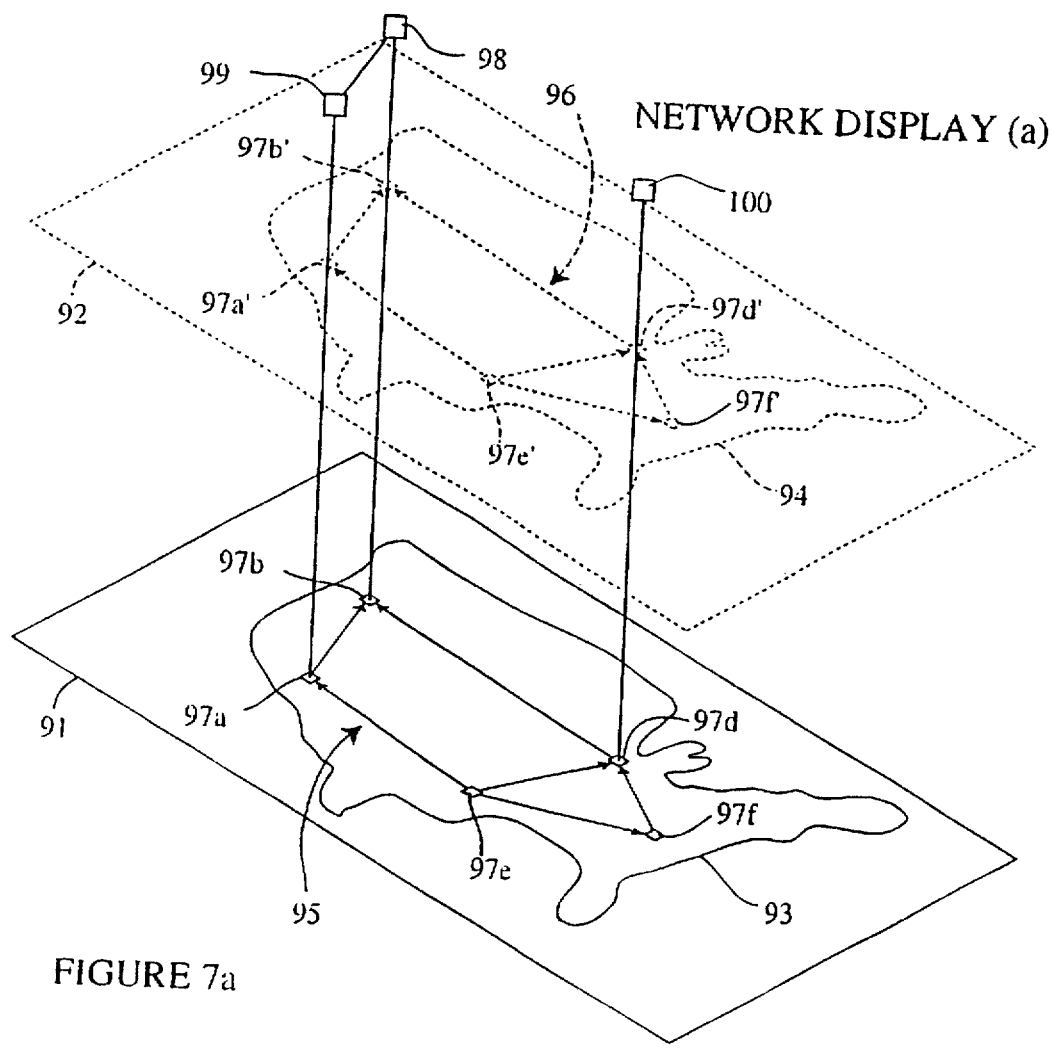
FIG. 7a is a diagram of a network display including a three dimensional network representation including first and second layers of Internet routing including a physical layer for example, according to the present invention.

FIG. 7a is a diagram of a network display including a three dimensional network representation including first and second layers 91 and 92 of Internet routing including a physical layer for example, according to the present invention. Layers 91 and 92 are interconnected at nodes 97a and 97a', 97b'and 97b', and 97dand 97d'. The various nodes represent objects such as sites or processors, for example. The network display includes diagrams of first and second networks 95 and 96 stacked over each other in a three dimensional representation such that the lower layer is not obscured by the upper layer. More than two layers can be represented within the view, stacked without obscuration over each other in three dimensions. These can include the physical layer, the data link layer, the network layer, the transport layer, the session layer, the presentation layer, and the application layer. The representation reflects a view providing a list of primary object classes (such as sites 97a–97f, and 97a'–'97f') and a list of strings representing object names. These strings may contain a character * which matches any character. Announced objects are tested against these lists to determine if they should be added to a particular view or representation. Each view maintains a list of graphical objects, one for each network object it displays. These objects contain all the information needed to represent a network object. This list is traversed when the view is rendered to the screen. After an object of a primary class is added to a view, request are made to add certain relations of the object. These relations are objects of classes that the type of view is equipped to display. Each type of diagram provides a different arrangement of data. In FIG. 7a, objects are assigned geographical locations and are prevented from occluding each other by a separating method according to the present invention.

Figure 7B:
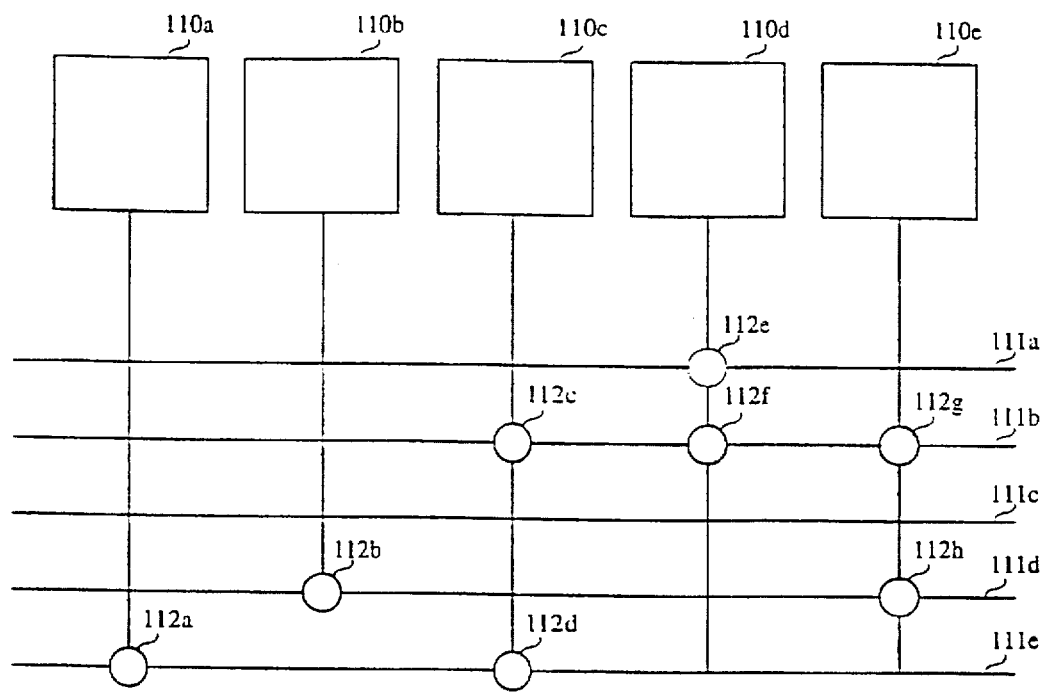
FIG. 7b is a diagram of a network display including a two is dimensional network representation showing hosts and their interface connections to particular subnets, according to the present invention.

FIG. 7b is a diagram of a network display including a two dimensional network representation showing hosts 110a–110e and their interface connections 112a–112e to particular subnets 111a–111e, according to the present invention. The representation reflects a view providing a list of primary object classes and a list of strings representing object names. These strings may contain a character * which matches any character. Announced objects are tested against these lists to determine if they should be added to a particular view or representation. Each view maintains a list of graphical objects, one for each network object it displays. These objects contain all the information needed to represent a network object. This list is traversed when the view is rendered to the screen. After an object of a primary class is added to a view, request are made to add certain relations of the object. These relations are objects of classes that the type of view is equipped to display. Each type of diagram provides a different arrangement of data. In FIG. 7b, processors are placed to be equidistant from each other horizontally across a grid.

Figure 7C:
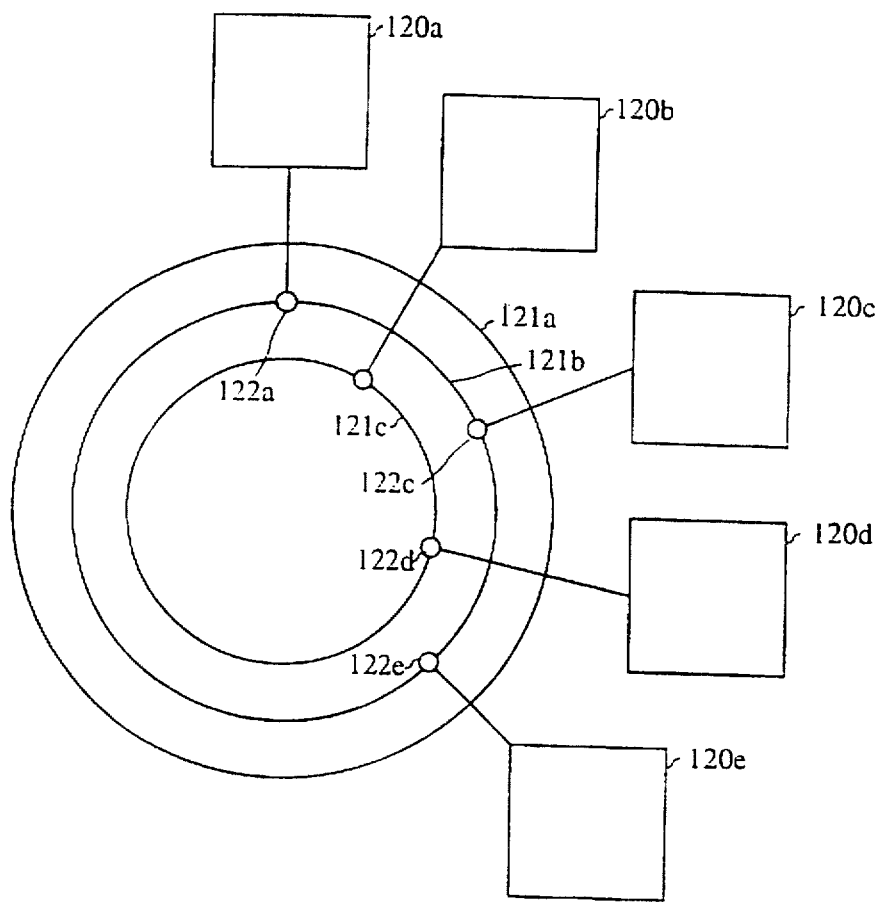
FIG. 7c is a diagram of a network display including a two dimensional network representation showing hosts and their interface connections to particular subnets, the subnets being shown as concentric circles, according to the present invention.

FIG. 7c is a diagram of a network display including a two dimensional network representation showing hosts 120a–120e and their interface connections 122a–122e to particular subnets 121a–121e, the subnets being shown as concentric circles, according to the present invention. The representation reflects a view providing a list of primary object classes and a list of strings representing object names. These strings may contain a character * which matches any character. Announced objects are tested against these lists to determine if they should be added to a particular view or representation. Each view maintains a list of graphical objects, one for each network object it displays. These objects contain all the information needed to represent a network object. This list is traversed when the view is rendered to the screen. After an object of a primary class is added to a view, request are made to add certain relations of the object. These relations are objects of classes that the type of view is equipped to display. Each type of diagram provides a different arrangement of data. In FIG. 7c, objects are assigned geographical locations and are prevented from occluding each other by a separating method according to the present invention. In the case of FIG. 7c, processors are placed to be equidistant around the circumference of a circle.

Figure 7D:
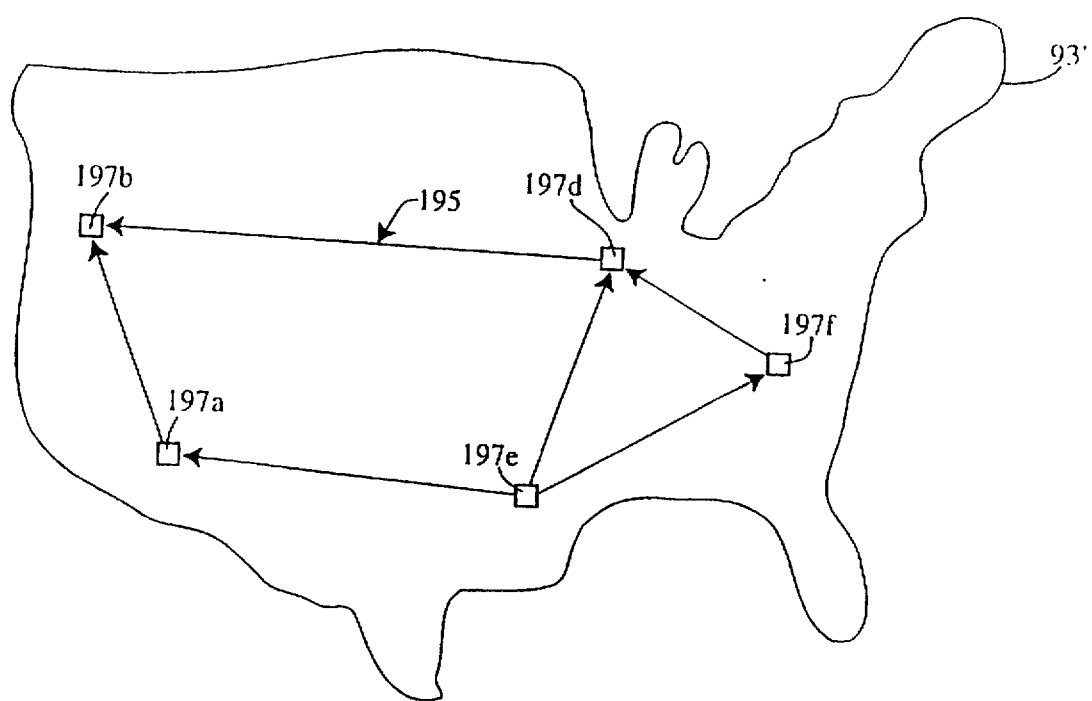
FIG. 7d is a diagram of a network display having a two dimensional network representation including a selected layer of Internet routing and showing routing directions, according to the present invention.

FIG. 7d is a diagram of a network display having a two dimensional network representation including a selected layer of Internet routing and showing routing directions within the United States 93', according to the present invention. The representation reflects a view including a list of selected objects 197a–197f, reflecting particular classes of objects. The selected objects 197a–197f are interconnected with vectors 195 to show the primary routing direction for each of objects 197a–197f. Announced objects are tested against these lists to determine if they should be added to a particular view or representation. Each view unique representations of selected graphical object classes, one for each class of network objects displayed. The object displays present all the information needed to represent a network object according to selected variables. After an object of a selected class is added to a view, requests are made further to represent certain relations with respect to the selected object. These relations are to objects of other selected classes that particular selected view is adapted to display. In FIG. 7d, objects are displayed in associated geographical locations, according to the present invention.

In each of FIGS. 7a–7d according to one embodiment of the present invention, updates from the server invoke changes in the views (e.g., color changes caused by a status change). According to another embodiment of the present invention, changes in relationships between objects (e.g., a processor moving to a different site) will cause a rearrangement between the objects in a view.

Figure 8A:
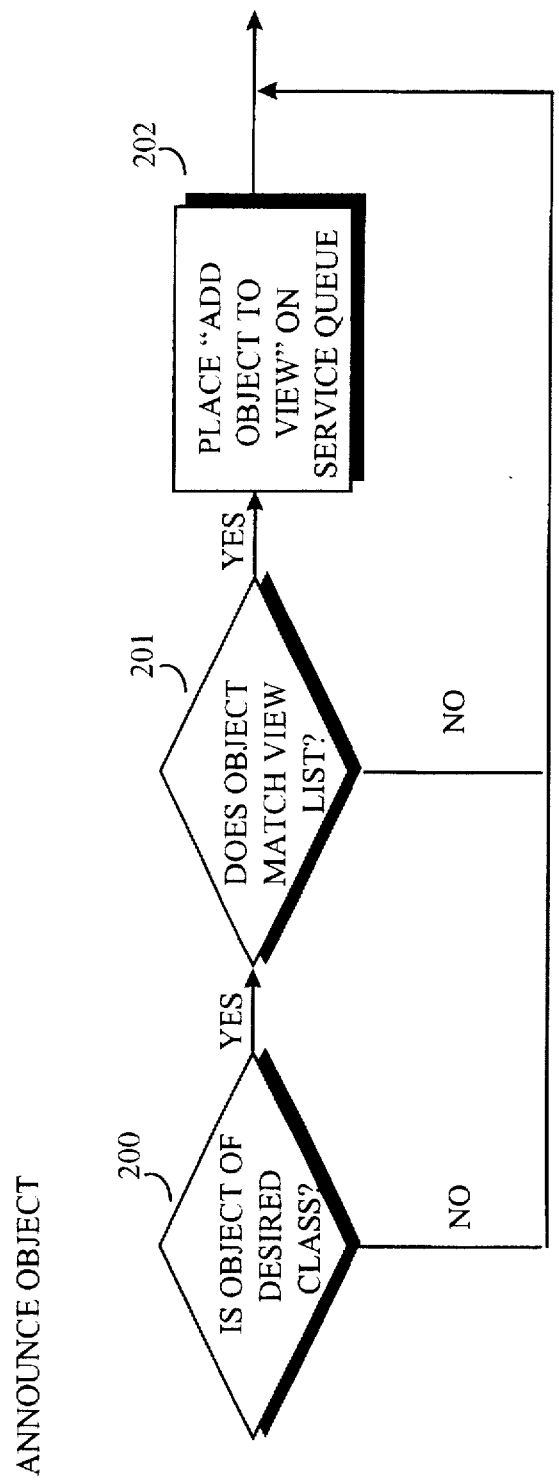
FIG. 8a is a flow chart showing object announcement for the network display of FIG. 7a, according to the present invention.

FIG. 8a is a flow chart showing the object announcement process for the network display of FIG. 7a, according to the present invention. Object announcement includes checking 200 whether a particular object considered for announcement is a class desired for announcement? If it does belong to the desired class of objects, then a check is made 201 of whether the object matches an element of a predetermined view list. If a match is found, an indication "add object to view" for the particular object is placed 202 on a service queue for being added to the current view on the display. However, if the object fails to belong to the desired class of objects, or if the object does not match the view list, no such indication "add object to view" is placed on the service queue.

Figure 8B:
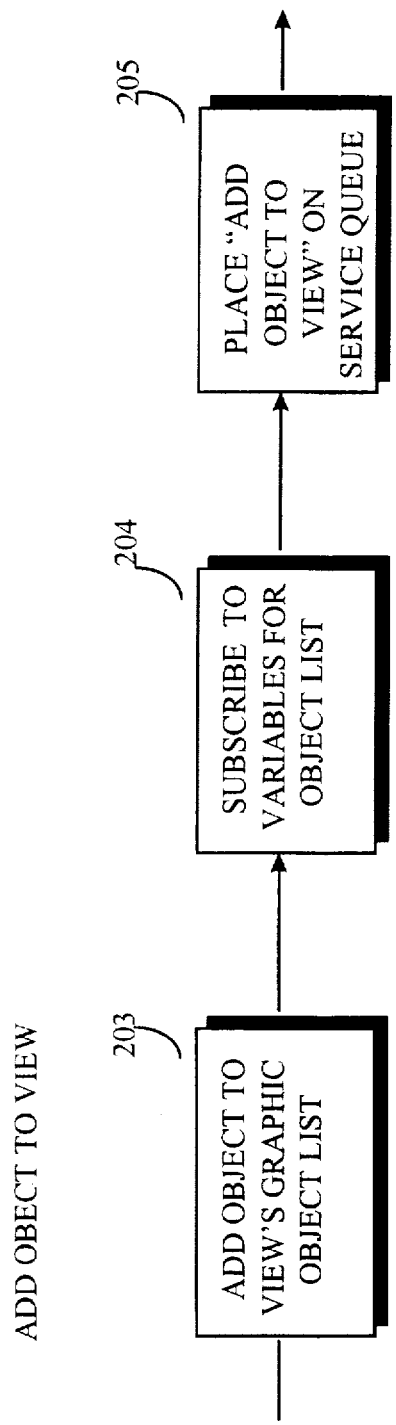
FIG. 8b is a flow chart showing object addition to view for the network display of FIG. 7a, according to the present invention.

FIG. 8b is a flow chart showing the method of object addition to a view for the network display of FIG. 7a, according to the present invention. First, the object is added 203 to a view's graphic object list. Next, a subscription is made 204 to selected variables for the object list. Finally, an indication "add object to view" for the particular object is placed 205 on a service queue for being added to the current view on the display.

Figure 8C:
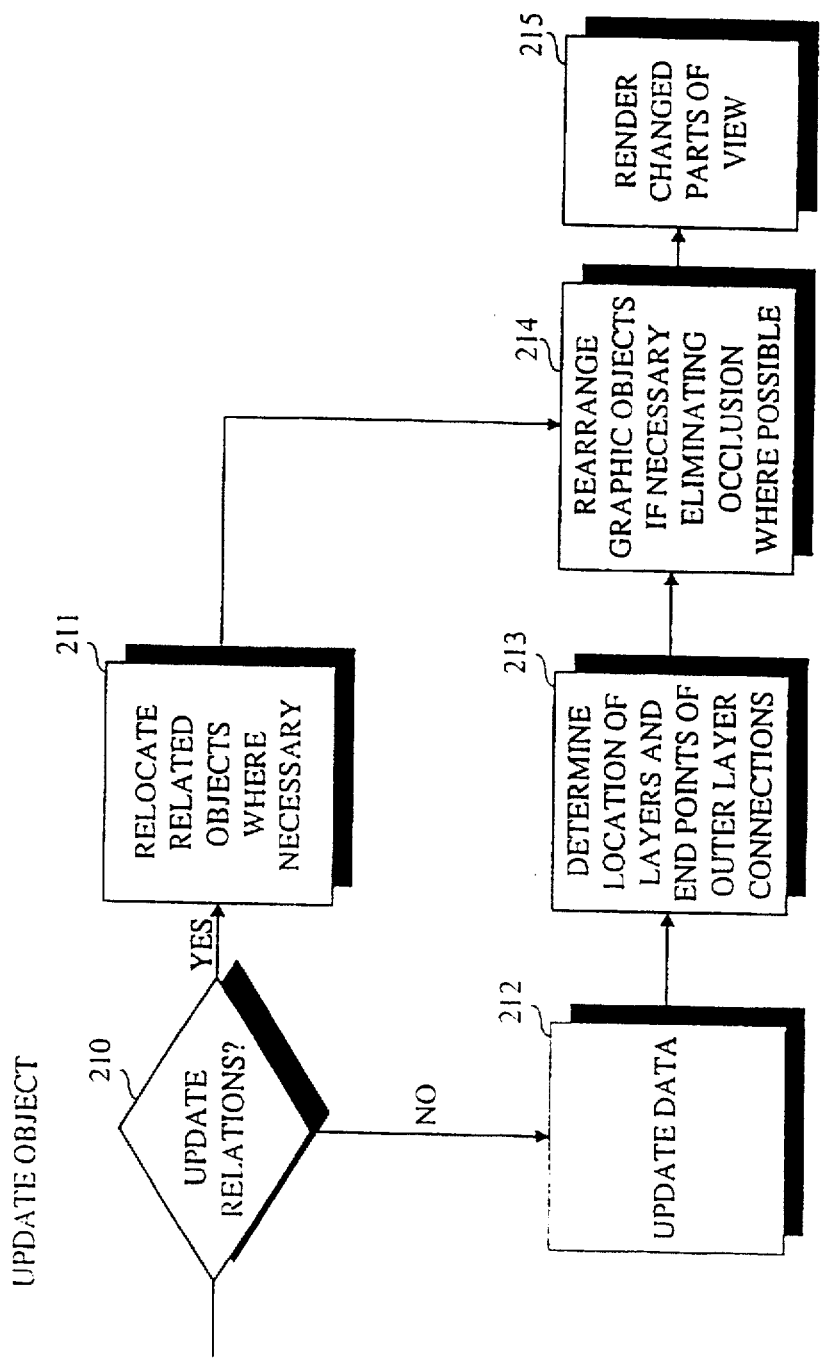
FIG. 8c is a flow chart showing object updating for the network display of FIG. 7a, according to the present invention.

FIG. 8c is a flow chart showing object updating for the network display of FIG. 7a which continually and automatically updates as new objects are announced, according to the present invention. First, a check is made 210 whether to update relations between objects. If yes, related objects are relocated 211 on the view as necessary. If not, applicable object data is updated 212. Next, a determination is made 213 to establish the locations of layers and end points of outer layer connections. After each determination 213 and each relocation 211, the graphic objects of the view are rearranged if necessary, to eliminate occlusion, to the extent possible. Finally, the changed parts of the view are rendered 215 to the display for presentation.

Figure 9A:
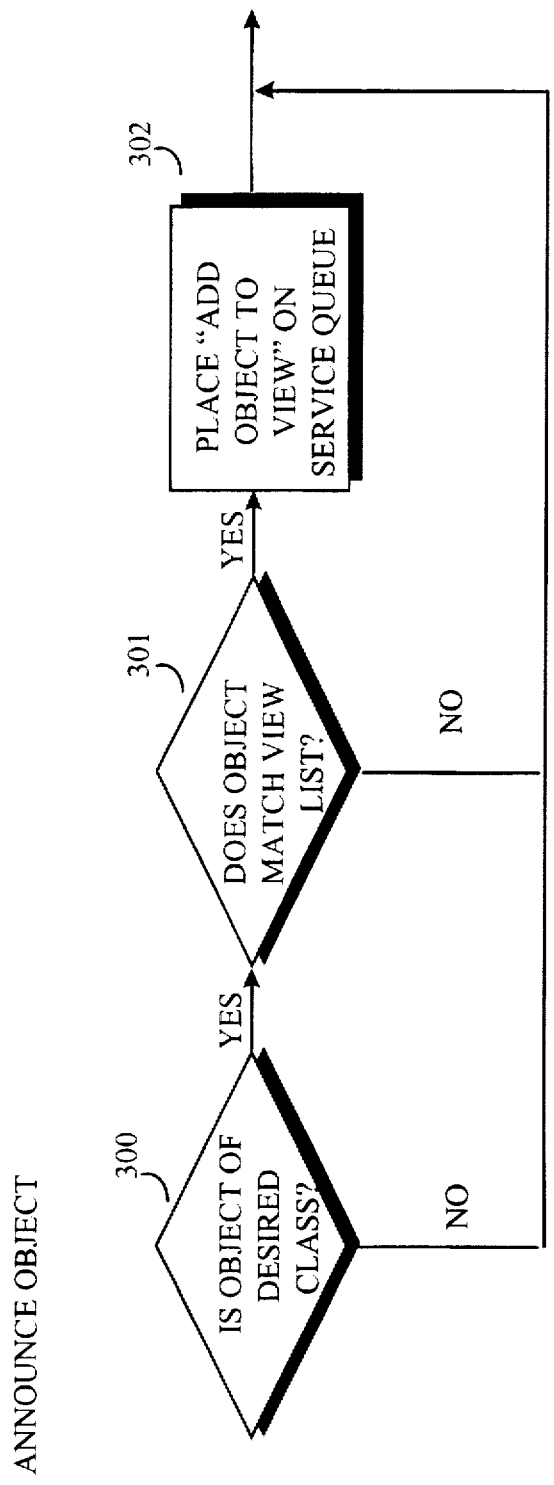
FIG. 9a is a flow chart showing object announcement for the network display of FIG. 7b, according to the present invention.

FIG. 9a is a flow chart showing object announcement for the network display of FIG. 7b, according to the present invention. Object announcement includes checking 300 whether a particular object considered for announcement is a class desired for announcement? If it does belong to the desired class of objects, then a check is made 301 of whether the object matches an element of a predetermined view list. If a match is found, an indication "add object to view" for the particular object is placed 302 on a service queue for being added to the current view on the display. However, if the object fails to belong to the desired class of objects, or if the object does not match the view list, no such indication "add object to view" is placed on the service queue.

Figure 9B:
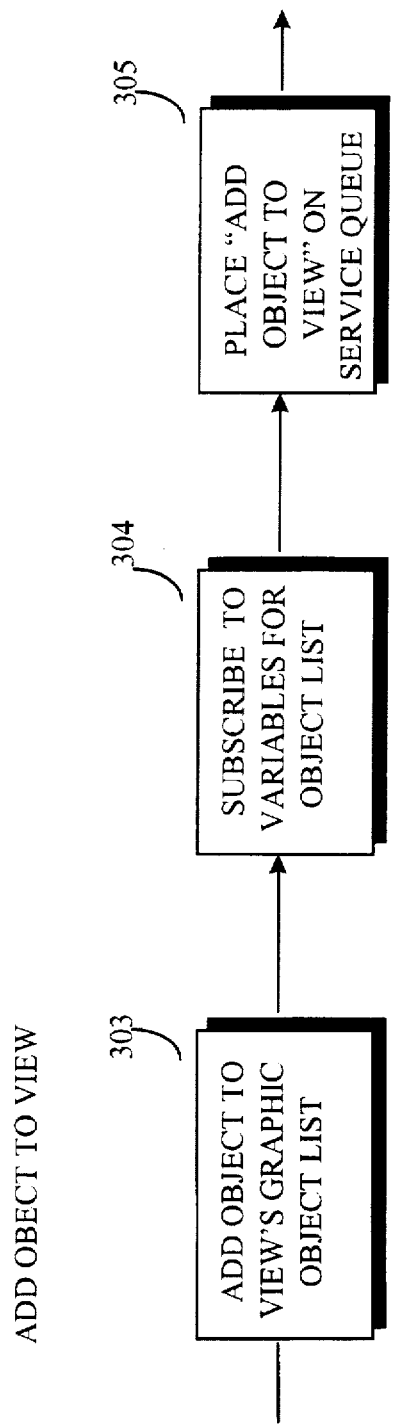
FIG. 9b is a flow chart showing object addition to view for the network display of FIG. 7b, according to the present invention.

FIG. 9b is a flow chart showing object addition to view for the network display of FIG. 7b, according to the present invention. First, the object is added 303 to a view's graphic object list. Next, a subscription is made 304 to selected variables for the object list. Finally, an indication "add object to view" for the particular object is placed 305 on a service queue for being added to the current view on the display.

Figure 9C:
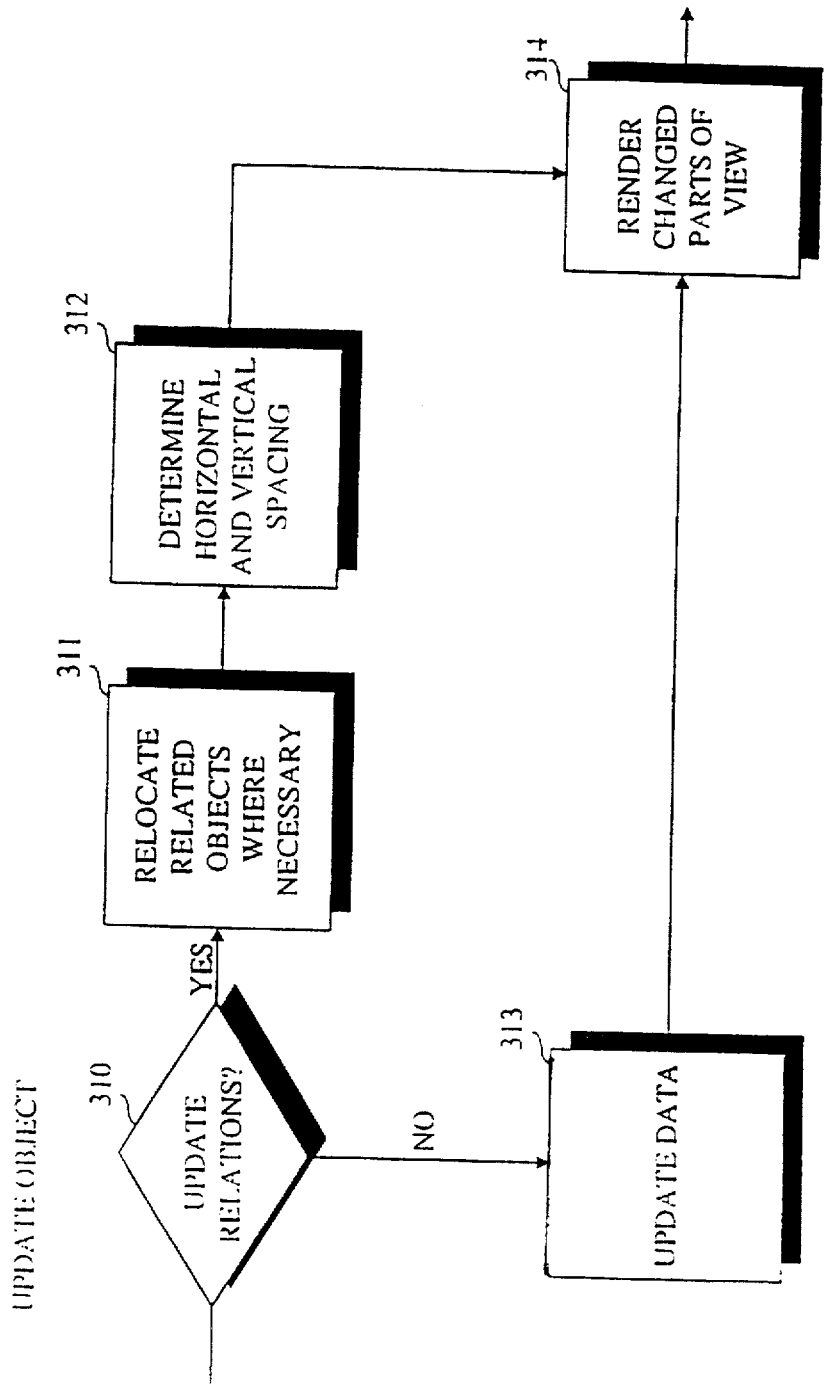
FIG. 9c is a flow chart showing object updating for the network display of FIG. 7b, according to the present invention.

FIG. 9c is a flow chart showing object updating for the network display of FIG. 7b which continually and automatically updates as new objects are announced, according to the present invention. First, a check is made 310 whether to update relations between objects. If yes, related objects are relocated 311 on the view as necessary. Then, a determination is made 312 of the applicable horizontal and vertical spacing 312. If not, applicable object data is updated 313. After each updating 313 and each horizontal and vertical spacing determination 312, the changed parts of the view are rendered 314 to the display for presentation.

Figure 10A:
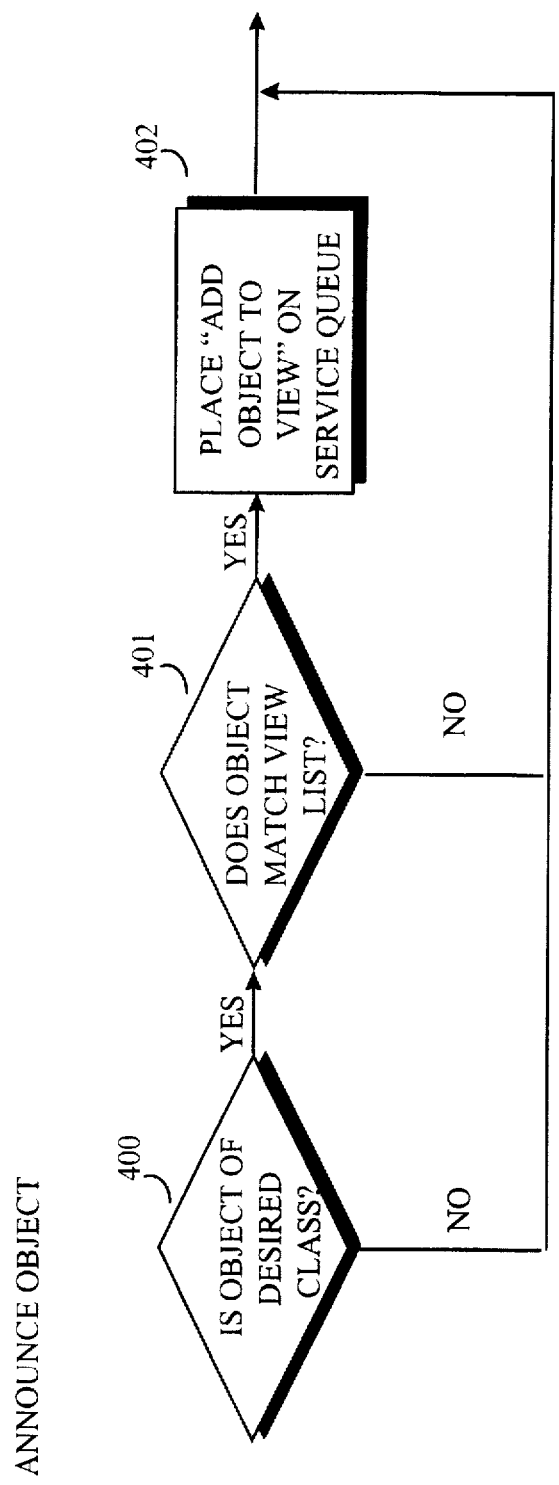
FIG. 10a is a flow chart showing object announcement for the network display of FIG. 7c, according to the present invention.

FIG. 10a is a flow chart showing object announcement for the network display of FIG. 7c, according to the present invention. Object announcement includes checking 400 whether a particular object considered for announcement is a class desired for announcement? If it does belong to the desired class of objects, then a check is made 401 of whether the object matches an element of a predetermined view list. If a match is found, an indication "add object to view" for the particular object is placed 402 on a service queue for being added to the current view on the display. However, if the object fails to belong to the desired class of objects, or if the object does not match the view list, no such indication "add object to view" is placed on the service queue.

Figure 10B:
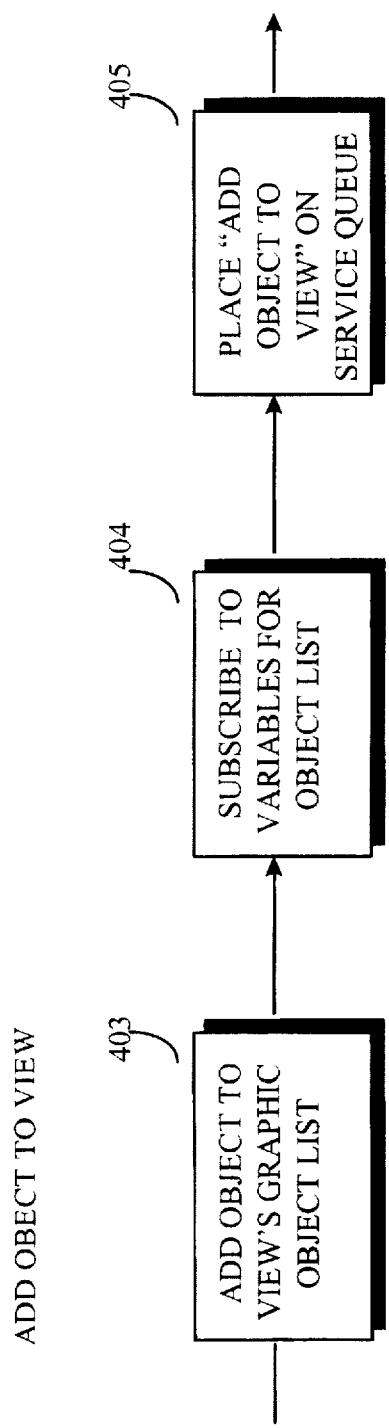
FIG. 10b is a flow chart showing object addition to view for the network display of FIG. 7c, according to the present invention.

FIG. 10b is a flow chart showing object addition to view for the network display of FIG. 7c, according to the present invention. First, the object is added 403 to a view's graphic object list. Next, a subscription is made 404 to selected variables for the object list. Finally, an indication "add object to view" for the particular object is placed 405 on a service queue for being added to the current view on the display.

Figure 10C:
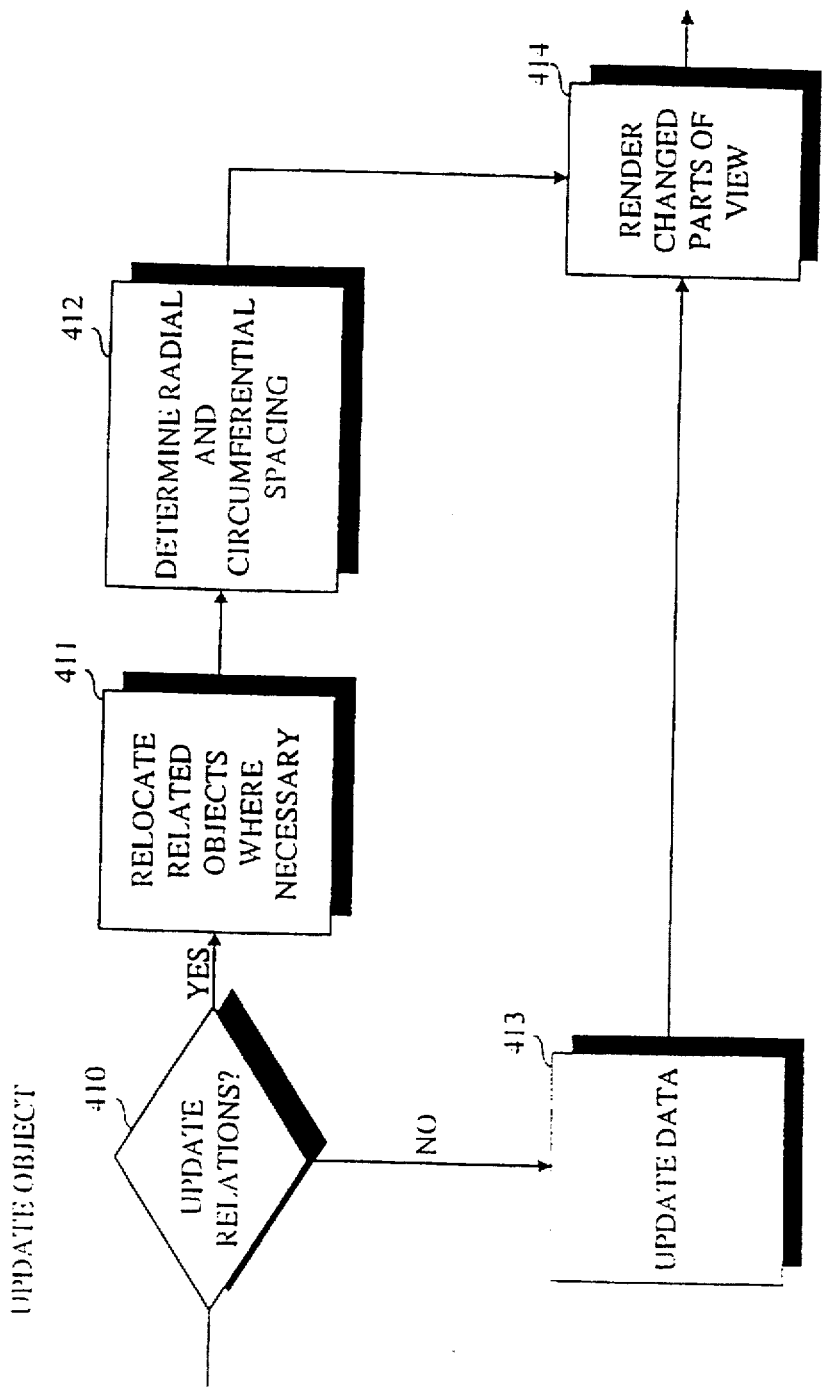
FIG. 10c is a flow chart showing object updating for the network display of FIG. 7c, according to the present invention.

FIG. 10c is a flow chart showing object updating for the network display of FIG. 7c which continually and automatically updates as new objects are announced, according to the present invention. First, a check is made 410 whether to update relations between objects. If yes, related objects are relocated 411 on the view as necessary. Then, a determination is made 412 of the applicable radial and circumpherential spacing 412. If not, applicable object data is updated 413. After each updating 413 and each horizontal and vertical spacing determination 412, the changed parts of the view are rendered 414 to the display for presentation.

Figure 11A:
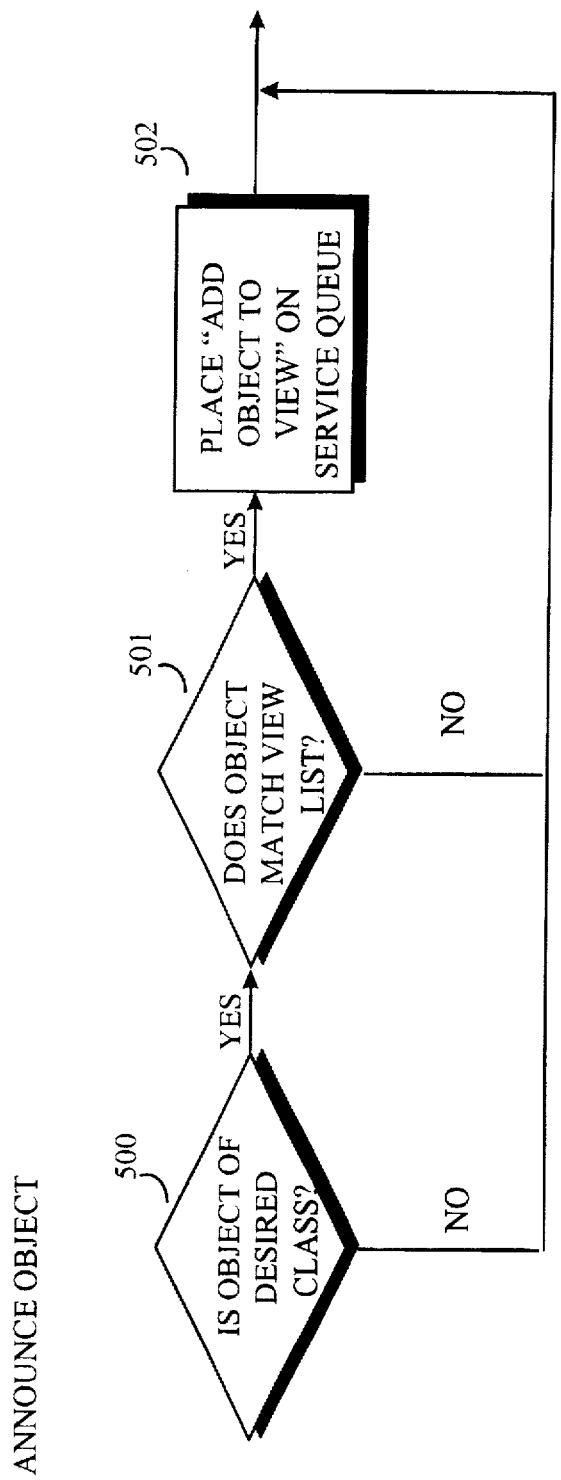
FIG. 11a is a flow chart showing object announcement for the network display of FIG. 7d, according to the present invention.

FIG. 11a is a flow chart showing object announcement for the network display of FIG. 7d, according to the present invention. Object announcement includes checking 500 whether a particular object considered for announcement is a class desired for announcement? If it does belong to the desired class of objects, then a check is made 501 of whether the object matches an element of a predetermined view list. If a match is found, an indication "add object to view" for the particular object is placed 502 on a service queue for being added to the current view on the display. However, if the object fails to belong to the desired class of objects, or if the object does not match the view list, no such indication "add object to view" is placed on the service queue.

Figure 11B:
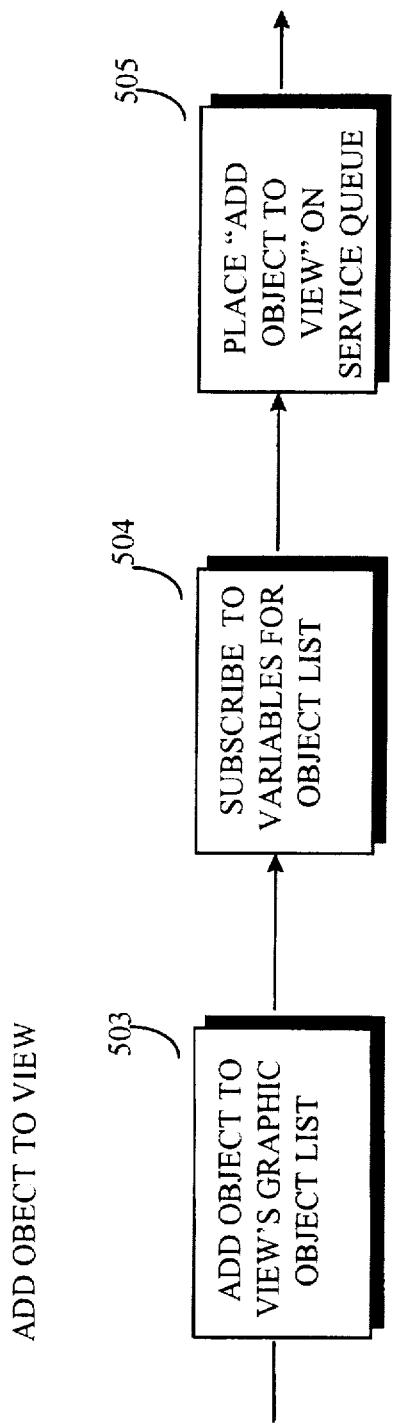
FIG. 11b is a flow chart showing object addition to view for the network display of FIG. 7d, according to the present invention.

FIG. 11b is a flow chart showing object addition to view for the network display of FIG. 7d, according to the present invention. First, the object is added 503 to a view's graphic object list. Next, a subscription is made 504 to selected variables for the object list. Finally, an indication "add object to view" for the particular object is placed 505 on a service queue for being added to the current view on the display.

Figure 11C:
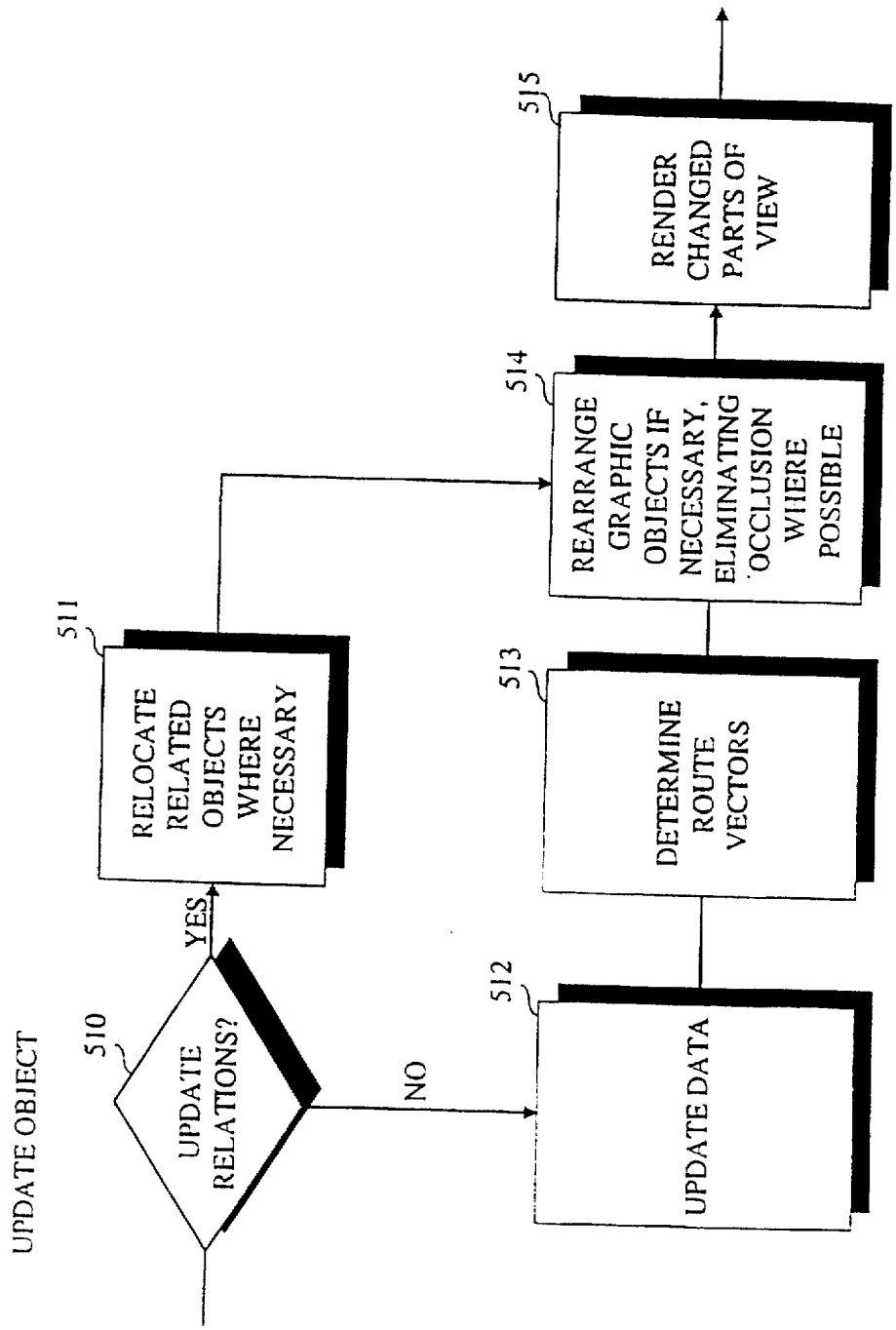
FIG. 11c is a flow chart showing object updating for the network display of FIG. 7d, according to the present invention.

FIG. 11c is a flow chart showing object updating for the network display of FIG. 7d which continually and automatically updates as new objects are announced, according to the present invention. First, a check is made 510 whether to update relations between objects. If yes, related objects are relocated 511 on the view as necessary. If not, applicable object data is updated 512. Next, applicable route vectors are determined 513. Then, the graphic objects are rearranged 515 if necessary, eliminating occlusion where possible. After each determination of route vectors 513 and each relocation 511 of related objects where necessary, graphic objects are rearranged 514, if necessary, thereby eliminating occlusion where possible. Then, the changed parts of the view are rendered 515 to the display for presentation.

According to the present invention, SNMP agents monitor objects such as the Internet, an Internet protocol (IP) network; an IP subnet; a LAN; a link; an interface; a processor such as a host, a router, or a bridge; a site, equipment, an administrator, and a postal address. Operational states of an object or element include responsive, non-responsive, and unreachable. Object data includes information to describe a particular HNMS object, including variables represented as name, i.e., value pairs which provide information apart from class, subclass, and status. The HNMS MIB includes variables describing the eleven classes of network objects, as well as a log entry group having variables used for reporting alarms and for storing free form textual data about any object. For example, the object data for an Interface includes its Ethernet address, its IP address, and its netmask. Object data also includes variables defining relations to an object. A relation exists if a variable contains a reference to the HNMS id of another object.

As is well known, ASN.1 is abstract syntax notation one, a CCITT/ISO formal datatype definition language. ASN.1 helps in the establishment of clear and uniform datatype definitions, the reuse of definitions, and separation of the definition of datatypes used in protocol exchanges from the encoding of data fro transmission across a network. The ASN.1 datatypes used in SNMP include integer, octet string, display string, null, object identifier, IP address, physical address, counter, gauge, time ticks, opaque, list, and table.

According to the present invention, device status can be monitored on a medium selected from a group consisting of Ethernet, token ring, FDDI (Fiber Distributed Data Interconnect), Ultranet, ATM (Asynchronous Transfer Mode), HiPPI (High Performance Parallel Interface), SONET (Synchronous Optical Network), synchronous transfer serial lines, and a cable link system.

According to an embodiment of the present invention, the HNMP protocol specification is as follows:

HNMP DEFINITIONS ::=BEGIN

```
-- Title: Hierarchical Network Management Protocol
-- IMPORTS
--      ObjectName, ObjectSyntax, IpAddress, TimeTicks
--      FROM RFC1155-SMI;

Message ::=
        SEQUENCE {
                version INTEGER { -- The version of HNMP.
                        version-1(1),
                        version-2(2)
                },
                community OCTET STRING, -- The HNMS community.
                from-module-type INTEGER,
                from-module-id INTEGER,
                to-module-id INTEGER,
                msg-timestamp TimeTicks,
```

```
                data PDU
        }

--Program Data Unit.
    PDU ::=
            CHOICE {{

-- CONNECTION MANAGEMENT
                    ack Ack-PDU,

-- MODULE MANAGEMENT
                    hello Hello-PDU,
                    welcome Welcome-PDU,
                    goodbye Goodbye-PDU,
                    get-key GetKey-PDU,
                    send-key DendKey-PDU, -- NETWORK OBJECT MANAGEMENT
                    announce-bject Announce-PDU,
                    delete-object Delete-PDU,
                    activate-object Active-PDU,
                    deactivate-object Deactivate-PDU, -- NETWORK OBJECT TOPOLOGY MANAGEMENT
                    subscribe-relations SubRelations-PDU,
                    unsubscribe-relations UnsubRelations-PDU,
                    send-relations SendRelations-PDU, -- NETWORK OBJECT DATA MANAGEMENT
                    subscribe-data SubData-PDU,
                    send-data SendData-PDU,
                    set-data SetData-PDU,
                    get-data GetData-PDU,
                    get-next-data GetNextData-PDU,
                    get-walk-data GetWalkData-PDU
            }
```

31

```
--HNMP requires that messages be transmitted reliably but not
--necessarily in sequence. A retransmission scheme must be used if
--HNMP PDUs are sent via an unreliable protocol such as UDP. The
--Ack message may be used to acknowledge receipt of each message
--and also to verify that connections between modules are still active
--when no other messages have been transmitted for some time.
Ack-PDU ::= [0]
    --   IMPLICIT SEQUENCE OF INTEGER
         IMPLICIT INTEGER --This is sent from an unconnected module to a server module, to
--request to be included in its HNMS community. Since an
--unconnected module does not have a module-id. the module-id field
--in a Hello message will be ignored.
Hello-PDU ::= [1]
         IMPLICIT NULL --This is the server's response to a Hello message. The to-module-id
--in the header is the module ID assigned to the new module.
Welcome-PDU ::= [2]
         IMPLICIT NULL --Used when any non-server module wants to disconnect from the
--server.
Goodbye-PDU ::= [3]
         IMPLICIT NULL --Used when one module wants to inform another of the server's
--location.
Redirect-PDU::= [4]
         IMPLICIT IpAddress --Used by UI modules to check out the key from the server module.
--Only one UI module may have the key at one time.
GetKey-PDU::= [5]
```

```
            IMPLICIT NULL

--Send the command key to the target module.  This may either be
        --the sever sending it to a UI that has requested it. or the UI sending
    5   --it back to the server when it is finished with it.
        SendKey-PDU::= [6]
            IMPLICIT NULL --Announce a new HNMS object.
    10  Announce-PDU::= [7]
            IMPLICIT ObjectBlock --Request that the specified HNMS object be destroyed.
        Delete-PDU::= [8]
    15      IMPLICIT ObjectId --Start monitoring the specified HNMS object.
        Activate-PDU::= [9]
            IMPLICIT ObjectId
    20
        --Stop monitoring the specified HNMS object
        Deactivate-PDU::= [10]
            IMPLICIT ObjectId 25  --Subscribe to the relation variables of this object.  The variables are
        --expected back in SendRelations messages.
        SubRelations-PDU::= [11]
            IMPLICIT ObjectBlock 30  --Stop the subscription to relations of the specified HNMS object.
        UnsubRelations-PDU::=[12]
            IMPLICIT ObjectId --Send relations of the specified HNMS object.
    35  SendRelations-PDU::=[13]
            IMPLICIT ObjectBlock
```

33

```
     --Set the specified variables to be the subscription for an HNMS
     --object. Whenever a subscribed variable changes. a SendData
     --containing the changed variables is expected in return.
 5   SubData-PDU::= [14]
          IMPLICIT ObjectBlock --Stop the subscription of all object data of the specified HNMS object.
     UnsubData-PDU::= [15]
10        IMPLICIT ObjectId --Send a list of variable name/value pairs about the specified
     --HNMS object.
     SendData-PDU::= [16]
15        IMPLICIT ObjectBlock --Send a list of variable name/value pairs about the specified HNMS
     --object.
     SendData-PDU::= [17]
20        IMPLICIT ObjectBlock --Request HNMS or SNMP variables concerning the given HNMS
     --object. A SendData containing the requested variables is expected|
     --in return.
25   GetData-PDU::= [18]
          IMPLICIT ObjectBlock --Request the next SNMP variables in the SNMP tree of a given HNMS
     --object. A SendData containing the variables is expected in return.
30   GetNextData-PDU::= [19]
          IMPLICIT ObjectBlock --Request a walk of an entire SNMP tree starting at the indicated
     --root points. for a given HNMS object. A SendData containing
35   --the variables is expected in return.
     GetWalkData-PDU::= [20]
```

```
            IMPLICIT ObjectBlock

ObjectId::=
            INTEGER

ObjectBlock::=
            SEQUENCE {
                object-id INTEGER
                variables VarBindList
            }

VarBindList::=
            SEQUENCE of VarBind

VarBind::=
            SEQUENCE {
                name ObjectName.
                value ObjectSyntax.
                interval INTEGER.
                timestamp TimeTicks
            }

ObjectName::=
            OBJECT IDENTIFIER

ObjectSyntax::
            ANY

IpAddress::= [APPLICATION 0]
            IMPLICIT OCTET STRING (SIZE (4))

TimeTicks::= [APPLICATION 3]
            IMPLICIT INTEGER

END
```

According to an embodiment of the present invention. the HNMP management information base (MIB) definition is as follows:

HNMS-MIB DEFINITIONS ::=BEGIN

```
-- IMPORTS
        experimental. IpAddress. TimeTicks
                FROM RFC1155-SMi
                OBJECT-TYPE
                    FROM RFC-1212
        DisplayString ::=
                OCTET STRING
        hnms-mib OBJECT IDENTIFIER ::= (experimental 99)
        --HNMS Object Hierarchy
--              Internet
--              / \ \
--             /   \ \
--            /     \ Module
--           /       \
--          /         \
--       Network      Site
--          |         | \ \
--          |         |  \ \
--          |         |   \ Equipment
--          |         |    \
--       Subnet    Processor Administrator Agent
--          |     /   |       \         /
--          |    /    |        \       /
--          |   /     |         \     /
--        Ipaddr   Interface    Any Object --         All relations point upward.
```

```
hnmsObject OBJECT IDENTIFIER ::= {HNMS-MIB 1 }
hnmsAgent OBJECT IDENTIFIER ::= {HNMS-MIB 2 }
hnmsInternet OBJECT IDENTIFIER ::= {HNMS-MIB 3 }
hnmsNetwork OBJECT IDENTIFIER ::= {HNMS-MIB 4 }
hnmsSubnet OBJECT IDENTIFIER ::= {HNMS-MIB 5 }
hnmsIpaddr OBJECT IDENTIFIER ::= {HNMS-MIB 6 }
hnmsSite OBJECT IDENTIFIER ::= {HNMS-MIB 7 }
hnmsProcessor OBJECT IDENTIFIER ::= {HNMS-MIB 8 }
hnmsInterface OBJECT IDENTIFIER ::= {HNMS-MIB 9 }
hnmsEquipment OBJECT IDENTIFIER ::= {HNMS-MIB 10 }
hnmsAdministrator OBJECT IDENTIFIER ::= {HNMS-MIB 11 }
hnmsModule OBJECT IDENTIFIER ::= {HNMS-MIB 12 }

--The HnmsObject group (describes all classes of HNMS objects)

hnmsObjUName OBJECT-TYPE
        SYNTAX DisplayString
        ACCESS read-only
        STATUS mandatory
        DESCRIPTION
                "The unique name of the object.  This is a human-readable
                SCII string that combines the Class, Subclass, and UString
                variables."
    ::= { hnmsObject 1 } hnmsObjClass OBJECT-TYPE
        SYNTAX INTEGER
        ACCESS read-only
        STATUS mandatory
        DESCRIPTION
                "The class of the object."
    ::= { hnmsObject 2 } hnmsObjSubclass OBJECT-TYPE
        SYNTAX DisplayString
        ACCESS read-only
```

```
            STATUS mandatory
            DESCRIPTION
                    "The subclass of the object, if appropriate."
        ::= { hnmsObject 3 } hnmsObjUString OBJECT-TYPE
            SYNTAX DisplayString
            ACCESS read-only
            STATUS mandatory
            DESCRIPTION
                    "A string that uniquely identifies this object among members of
    its class and subclass."
        ::= { hnmsObject 4 } hnmsObjActive OBJECT-TYPE
            SYNTAX INTEGER
            ACCESS read-only
            STATUS mandatory
            DESCRIPTION
                    "1 if the object is active, 0 if it is inactive."
        ::= { hnmsObject 5 } hnmsObjOperStatus OBJECT-TYPE
            SYNTAX INTEGER {
                    reachable (1),
                    nonresponsive (2),
                    unreachable (3),
                    unknown (4)
                    }
            ACCESS read-only
            STATUS mandatory
            DESCRIPTION
                    "The operational status of the object."
        ::= { hnmsObject 6 } hnmsObjAdminStatus OBJECT-TYPE
```

```
            SYNTAX INTEGER {
                up(1),
                down(2),
                testing(3)
  5             }
            ACCESS read-only
            STATUS mandatory
            DESCRIPTION
                "The administrative status of the object."
 10     ::= { hnmsObject 7 } hnmsObjReachStatus OBJECT-TYPE
            SYNTAX INTEGER {
                up(1),
 15             down(2),
                testing(3)
                }
            ACCESS read-only
            STATUS mandatory
 20         DESCRIPTION
                "The reachability status of the object."
        ::= { hnmsObject 8 } hnmsObjIpParent OBJECT-TYPE
 25         SYNTAX OCTET STRING
            ACCESS read-only
            STATUS mandatory
            DESCRIPTION
                "The unique name of the IP parent of the object (using the class
 30     progression Ipaddr-> Subnet -> Network-> Internet)."
        ::= { hnmsObject 9 } hnmsObjPhysParent OBJECT-TYPE
            SYNTAX OCTET STRING
 35         ACCESS read-only
            STATUS mandatory
```

```
                DESCRIPTION
                        "The unique name of the physical parent of the object (using
                the class progression (IpaddrIInterface)-> Processor -> Site-> Internet)."
                ::= { hnmsObject 10 } hnmsObjAdminParent OBJECT-TYPE
                SYNTAX OCTET STRING
                ACCESS read-only
                STATUS mandatory
                DESCRIPTION
                        "The unique name of the parent Administrator of the object."
                ::= { hnmsObject 11 } hnmsObjAgent OBJECT-TYPE
                SYNTAX OCTET STRING
                ACCESS read-only
                STATUS mandatory
                DESCRIPTION
                        "The unique name of the parent Agent of the object."
                ::= { hnmsObject 12 } hnmsObjIpaddr OBJECT-TYPE
                SYNTAX OCTET STRING
                ACCESS read-only
                STATUS mandatory
                DESCRIPTION
                        "The IP address of the object, for those objects that have an IP
                address."
                ::= { hnmsObject 13 } hnmsObjMask OBJECT-TYPE
                SYNTAX OCTET STRING
                ACCESS read-only
                STATUS mandatory
                DESCRIPTION
```

"The network mask of the object, for those objects that have IP addresses."
::= { hnmsObject 14 } hnmsLastEvent OBJECT-TYPE
    SYNTAX OCTET STRING
    ACCESS read-only
    STATUS mandatory
    DESCRIPTION
        "A textual description of the last important event that happened to this object."
::= { hnmsObject 15 } hnmsObjLabel OBJECT-TYPE
    SYNTAX OCTET STRING
    ACCESS read-only
    STATUS mandatory
    DESCRIPTION
        "A pretty-printable label for the object."
::= { hnmsObject 16 }

--The HNMSAgent Group
hnmsAgentIpaddr OBJECT-TYPE
    SYNTAX IpAddress
    ACCESS read-only
    STATUS mandatory
    DESCRIPTION
        "The IP address that we are currently using to poll this agent."
::= { hnmsAgent 1 } hnmsAgentCommunity OBJECT-TYPE
    SYNTAX OCTET STRING
    ACCESS read-only
    STATUS mandatory
    DESCRIPTION "The SNMP community name that we are currently using to poll this agent."
::= { hnmsAgent 2 } hnmsAgentLstDiscoverTime OBJECT-TYPE
    SYNTAX TimeTicks
    ACCESS read-only
    STATUS mandatory
    DESCRIPTION
        "The last time we sent a discovery operation to the agent."
::= { hnmsAgent 3 }

-- the HNMS Internet group
--the Hnms Network group
-- the HnmsSubnet group
hnmsSubnetMask OBJECT-TYPE
    SYNTAX IpAddress
    ACCESS read-only
    STATUS mandatory
    DESCRIPTION
        "Netmask of the Subnet."
::= { hnmsSubnet 1 } hnmsSubnetBPS OBJECT-TYPE
    SYNTAX INTEGER
    ACCESS read-only
    STATUS mandatory
    DESCRIPTION
        "BPS over the Subnet, averaged over the last poll interval."
::= { hnmsSubnet 2 } hnmsSubnetPPS OBJECT-TYPE
    SYNTAX INTEGER
    ACCESS read-only
    STATUS mandatory
    DESCRIPTION "PPS over the Subnet, averaged over the last poll interval."
::= { hnmsSubnet 3 }

-- The HnmsIpaddr group
hnmsIpaddrdrIfIndex OBJECT-TYPE
    SYNTAX INTEGER
    ACCESS read-only
    STATUS mandatory
    DESCRIPTION
        "The ifIndex of the interfface that corresponds to this IP
address, if appropriate."
::= { hnmsIpaddr 1 } hnmsIpaddrLastEchoOut OBJECT-TYPE
    SYNTAX TimeTicks
    ACCESS read-only
    STATUS mandatory
    DESCRIPTION
        "The last time an ICMP echo was sent out to this Ipaddr."
::= { hnmsIpaddr 2 } hnmsIpaddrLastEchoIn OBJECT-TYPE
    SYNTAX TimeTicks
    ACCESS read-only
    STATUS mandatory
    DESCRIPTION
        "The last time an ICMP echo was returned from this Ipaddr."
::= { hnmsIpaddr 3 }

```
        hnmsIpaddrLastPktIn OBJECT-TYPE
            SYNTAX TimeTicks
            ACCESS read-only
            STATUS mandatory
5           DESCRIPTION
                "The last time any packet was seen originating from this
        Ipaddr."
            ::= { hnmsIpaddr 4 }

10      hnmsIpaddrRTT OBJECT-TYPE
            SYNTAX INTEGER
            ACCESS read-only
            STATUS mandatory
            DESCRIPTION
15              "The approximate round-trip time to this Ipaddr, in
        milliseconds, the last time it was polled for reachability status."
            ::= { hnmsIpaddr 5 } hnmsIpaddrBPS OBJECT-TYPE
20          SYNTAX INTEGER
            ACCESS read-only
            STATUS mandatory
            DESCRIPTION
                "BPS through the Ipaddr, averaged over the last poll interval."
25          ::= { hnmsIpaddr 6 }
```

```
hnmsIpaddrPPS OBJECT-TYPE
        SYNTAX INTEGER
        ACCESS read-only
        STATUS mandatory
        DESCRIPTION
                "PPS through the Ipaddr, averaged over the last poll interval."
    ::= { hnmsIpaddr 7 } hnmsIpaddrFQDN OBJECT-TYPE
        SYNTAX IpAddress
        ACCESS read-only
        STATUS mandatory
        DESCRIPTION
                "A fully-qualified domain name that this IP address resolves
    to."
    ::= { hnmsIpaddr 8 }

--The HnmsProcessor group
hnmsIfProcIfIndex OBJECT-TYPE
        SYNTAX INTEGER
        ACCESS read-only
        STATUS mandatory
        DESCRIPTION
                "The index of the interface into the parent Processor's ifTable."
    ::= { hnmsInterface 1 }
```

```
         --The HnmsProcessor group
         hnmsProcFQDN OBJECT-TYPE
                 SYNTAX DisplayString
                 ACCESS read-only
 5               STATUS mandatory
                 DESCRIPTION
                         "The fully qualified domain name of the Processor."
         ::= { hnmsProcessor 1 }

10       hnmsProcBPS OBJECT-TYPE
                 SYNTAX INTEGER
                 ACCESS read-only
                 STATUS mandatory
                 DESCRIPTION
15                       "BPS through the Processor. averaged over the last poll
         interval."
         ::= { hnmsProcessor 2 } hnmsProcPPS OBJECT-TYPE
20               SYNTAX INTEGER
                 ACCESS read-only
                 STATUS mandatory
                 DESCRIPTION
                         "PPS through the Processor. averaged over the last poll
25       interval."
         ::= { hnmsProcess 3 }
```

```
              --the hnms Site group
              hnmsSiteName OBJECT-TYPE
                      SYNTAX DisplayString
                      ACCESS read-only
 5                    STATUS mandatory
                      DESCRIPTION
                              "The name of the Site."
              ::= { hnmsSite 1 }

10            hnmsSiteLocation OBJECT-TYPE
                      SYNTAX DisplayString
                      ACCESS read-only
                      STATUS mandatory
                      DESCRIPTION
15                            "The longitude and latitude of the Site."
              ::= { hnmsSite 2 } hnmsSiteAddr OBJECT-TYPE
                      SYNTAX DisplayString
20                    ACCESS read-only
                      STATUS mandatory
                      DESCRIPTION
                              "The mailing address of the Site."
              ::= { hnmsSite 3 }
25
              --the hnmsEquipment group
              hnmsEquipTagNo OBJECT-TYPE
                      SYNTAX DisplayString
                      ACCESS read-only
30                    STATUS mandatory
                      DESCRIPTION
                              "The tag ID of the Equipment."
              ::= { hnmsEquipment 1 }
```

```
hnmsEquipLocation OBJECT-TYPE
        SYNTAX DisplayString
        ACCESS read-only
        STATUS mandatory
        DESCRIPTION
                "The physical location the Equipment."
    ::= { hnmsEquipment 2 } hnmsEquipDescription OBJECT-TYPE
        SYNTAX DisplayString
        ACCESS read-only
        STATUS mandatory
        DESCRIPTION
                "The description of the Equipment."
    ::= { hnmsEquipment 3 }

--the hnmsAdministrator group
hnmsAdminName OBJECT-TYPE
        SYNTAX DisplayString
        ACCESS read-only
        STATUS mandatory
        DESCRIPTION
                "The name of the Administrator."
    ::= { hnmsAdministrator 1 } hnmsAdminPhone1 OBJECT-TYPE
        SYNTAX DisplayString
        ACCESS read-only
        STATUS mandatory
        DESCRIPTION
                "The first phone # of the Administrator."
    ::= { hnmsAdministrator 2 }
```

```
hnmsAdminPhone2 OBJECT-TYPE
        SYNTAX DisplayString
        ACCESS read-only
        STATUS mandatory
        DESCRIPTION
            "The second phone # of the Administrator."
    ::= { hnmsAdministrator 3 } hnmsAdminPager OBJECT-TYPE
        SYNTAX DisplayString
        ACCESS read-only
        STATUS mandatory
        DESCRIPTION
            "The pager # of the Administrator."
    ::= { hnmsAdministrator 4 } hnmsAdminFax OBJECT-TYPE
        SYNTAX DisplayString
        ACCESS read-only
        STATUS mandatory
        DESCRIPTION
            "The fax # of the Administrator."
    ::= { hnmsAdministrator 5 } hnmsAdminEmail OBJECT-TYPE
        SYNTAX DisplayString
        ACCESS read-only
        STATUS mandatory
        DESCRIPTION
            "The email address of the Administrator."
    ::= { hnmsAdministrator 6 }
```

```
hnmsAdminAddr OBJECT-TYPE
        SYNTAX DisplayString
        ACCESS read-only
        STATUS mandatory
        DESCRIPTION
            "The mailing address of the Administrator."
    ::= { hnmsAdministrator 7 }

--The HnmsModule group
hnmsModuleType OBJECT-TYPE
        SYNTAX INTEGER {
            server (1),
            ui (2),
            io (3),
            rbip (4)
        }
        ACCESS read-only
        STATUS mandatory
        DESCRIPTION
            "The type of module."
    ::= { hnmsModule 1 } hnmsModuleId OBJECT-TYPE
        SYNTAX INTEGER
        ACCESS read-only
        STATUS mandatory
        DESCRIPTION
            "The id of module."
    ::= { hnmsModule 2 }
```

```
        hnmsModuleHostName OBJECT-TYPE
                SYNTAX DisplayString
                ACCESS read-only
                STATUS mandatory
5               DESCRIPTION
                        "The FQDN of the host on which the module runs."
        ::= { hnmsModule 3 } hnmsModuleIpaddr OBJECT-TYPE
10              SYNTAX IpAddress
                ACCESS read-only
                STATUS mandatory
                DESCRIPTION
                        "The IP address that the module uses for HNMP."
15      ::= { hnmsModule 4 } hnmsModuleUdpPort OBJECT-TYPE
                SYNTAX INTEGER
                ACCESS read-only
20              STATUS mandatory
                DESCRIPTION
                        "The UDP port that the module uses for HNMP."
        ::= { hnmsModule 5 }

25      hnmsModuleHnmsCommunity OBJECT-TYPE
                SYNTAX DisplayString
                ACCESS read-only
                STATUS mandatory
                DESCRIPTION
30                      "The HNMS community name."
        ::= { hnmsModule 6 }
```

```
           hnmsModuleHnmsHome OBJECT-TYPE
               SYNTAX DisplayString
               ACCESS read-only
               STATUS mandatory
 5             DESCRIPTION
                    "The HNMS_HOME directory path."
           ::= { hnmsModule 7 } hnmsModuleDebugFlags OBJECT-TYPE
10             SYNTAX INTEGER
               ACCESS read-only
               STATUS mandatory
               DESCRIPTION
                    "Bitwise flags indicating what debugging information should
15         be displayed to stdout."
           ::= { hnmsModule 8 } hnmsModuleCurrentServerHost OBJECT-TYPE
               SYNTAX DisplayString
20             ACCESS read-only
               STATUS mandatory
               DESCRIPTION
                    "The name of the host on which the server for this HNMS
           community is currently running."
25         ::= { hnmsModule 9 } hnmsModuleHnmpTimestampIn OBJECT-TYPE
               SYNTAX TimeTricks
               ACCESS read-only
30             STATUS mandatory
               DESCRIPTION
                    "The last time a message was received."
           ::= { hnmsModule 10 }
```

52

```
hnmsModuleHnmpTimestampOut OBJECT-TYPE
        SYNTAX TimeTicks
        ACCESS read-only
        STATUS mandatory
        DESCRIPTION
                "The last time a message was sent out."
    ::= { hnmsModule 11 } hnmsModuleHnmpLastMsgId OBJECT-TYPE
        SYNTAX INTEGER
        ACCESS read-only
        STATUS mandatory
        DESCRIPTION
                "The message-id of the last message sent by the module."
    ::= { hnmsModule 12 } hnmsModuleHnmpMsgs OBJECT-TYPE
        SYNTAX INTEGER
        ACCESS read-only
        STATUS mandatory
        DESCRIPTION
                "The number of HNMP messages that the module has
generated."
    ::= { hnmsModule 13 } hnmsModuleHnmpRetransMsgs OBJECT-TYPE
        SYNTAX INTEGER
        ACCESS read-only
        STATUS mandatory
        DESCRIPTION
                "The number of times the module has had to retransmit HNMP
messages."
    ::= { hnmsModule 14 }
```

```
        hnmsModuleHnmpWinSize OBJECT-TYPE
            SYNTAX INTEGER
            ACCESS read-only
            STATUS mandatory
 5          DESCRIPTION
                "The HNMP window size, in messages."
        ::= { hnmsModule 15 } hnmsModuleHnmpRetransInterval OBJECT-TYPE
10          SYNTAX INTEGER
            ACCESS read-only
            STATUS mandatory
            DESCRIPTION
                "The HNMP message retransmit interval, in seconds."
15      ::= { hnmsModule 16 } hnmsModuleHnmpConnTimeout OBJECT-TYPE
            SYNTAX INTEGER
            ACCESS read-only
20          STATUS mandatory
            DESCRIPTION
                "The HNMP connection timeout, in seconds."
        ::= { hnmsModule 17 }

25      hnmsModuleHnmpAckInterval OBJECT-TYPE
            SYNTAX INTEGER
            ACCESS read-only
            STATUS mandatory
            DESCRIPTION
30              "The HNMP connection Ack interval, in seconds."
        ::= { hnmsModule 18 }
```

```
hnmsModuleServerSyncInterval OBJECT-TYPE
        SYNTAX INTEGER
        ACCESS read-only
        STATUS mandatory
        DESCRIPTION
                "The interval at which the server dumps its database to disk."
::= { hnmsModule 19 } hnmsModuleServerCreateInterval OBJECT-TYPE
        SYNTAX INTEGER
        ACCESS read-only
        STATUS mandatory
        DESCRIPTION
                "The interval at which the server creates new objects from
existing objects."
::= { hnmsModule 20 } hnmsModuleServerAssignInterval OBJECT-TYPE
        SYNTAX INTEGER
        ACCESS read-only
        STATUS mandatory
        DESCRIPTION
                "The interval at which the server assigns reachability status to
objects."
::= { hnmsModule 21 } hnmsModuleIoNonresponsive OBJECT-TYPE
        SYNTAX INTEGER
        ACCESS read-only
        STATUS mandatory
        DESCRIPTION
                "The time to go from responsive to nonresponsive."
::= { hnmsModule 22 }
```

```
hnmsModuleIoUnreachable OBJECT-TYPE
        SYNTAX INTEGER
        ACCESS read-only
        STATUS mandatory
        DESCRIPTION
            "The time to go from responsive to unreachable."
    ::= { hnmsModule 23 } hnmsModuleIoReachInterval OBJECT-TYPE
        SYNTAX INTEGER
        ACCESS read-only
        STATUS mandatory
        DESCRIPTION
            "The polling interval for reachability status."
    ::= { hnmsModule 24 } hnmsModuleIoCacheCheckInterval OBJECT-TYPE
        SYNTAX INTEGER
        ACCESS read-only
        STATUS mandatory
        DESCRIPTION
            "The interval at which the IO module checks it's MAC-layer IP
address cache for new addresses or status updates on existing addresses."
    ::= { hnmsModule 25 } hnmsModuleIoDiscoverInterval OBJECT-TYPE
        SYNTAX INTEGER
        ACCESS read-only
        STATUS mandatory
        DESCRIPTION
            "The time, in seconds, that the IO module waits before re-
discovering objects from an agent."
    ::= { hnmsModule 26 }
```

```
hnmsModuleIoAgentFilter OBJECT-TYPE
    SYNTAX OCTET STRING
    ACCESS read-only
    STATUS mandatory
    DESCRIPTION
        "The IP address filter list that the IO module uses to screen
what agents it may proactively monitor."
    ::= { hnmsModule 27 } hnmsModuleIoDefSnmpCommunity OBJECT-TYPE
    SYNTAX OCTET STRING
    ACCESS read-only
    STATUS mandatory
    DESCRIPTION
        "The default SNMP community name that the IO module uses
for discovery operations."
    ::= { hnmsModule 28 } hnmsModuleIoRampTime OBJECT-TYPE
    SYNTAX INTEGER
    ACCESS read-only
    STATUS mandatory
    DESCRIPTION
        "The amount of time to pass before the IO module goes into
steady-state operation (status polling)."
    ::= { hnmsModule 29 } hnmsModuleRBIPCalcInterval OBJECT-TYPE
    SYNTAX INTEGER
    ACCESS read-only
    STATUS mandatory
    DESCRIPTION
        "The interval at which the RBIP module recalculates statistics."
    ::= { hnmsModule 30 }
```

57

What is claimed is:

1. A network management system having multiple network sites, comprising:
    at least a single standard network management protocol agent;
    at least a first and a second input/output module respectively at a first and a second site which connect to said at least a single standard network management protocol agent, said standard network management protocol agent and said input/output modules being configured for standard network management protocol communications;
    a three dimensional display of network information from the first and second network sites according to an open software interconnect layer with routing direction being indicated with arrows and objects being repositioned in the views, and
    a server module connected to said at least a first and a second input/output module, said server module and said input/output modules being configured for hierarchical network management system communication, by asking a selected node for the node's routing table of adjacent nodes, and asking each of the adjacent nodes for the adjacent nodes' respective routing tables.

2. The network management system according to claim 1, comprising a plurality of standard network management protocol agents at a single site, each of said standard network management protocol agents being connected to said at least a first and second input/output module.

3. The network management system according to claim 1, comprising first and second pluralities of standard network management protocol agents which correspond to said first and second input/output modules, at corresponding said first and second sites, said first and second pluralities of standard network management protocol agents being connected to said respective first and second input/output modules.

4. The network management system according to claim 3, wherein each of said first and second input/output modules is connected to said server module.

5. The network management system according to claim 1, comprising a plurality of standard network management protocol agents, said at least a single input/output module, and said server module being at one of said first and second site.

6. The network management system according to claim 1, comprising a user interface module connected to said server module, said user interface module configured for hierarchical network management system communication with said server module.

7. A method of communicating between first and second network sites, each of said sites having a plurality of standard network management protocol agents connected to an input/output module, one of said sites being the hub of a server module located inside, the input/output modules of both said sites being connected to said server module, comprising the steps of:
    conducting exclusively standard network management protocol communications between the standard network management protocol agents at each site and the input/output module at the corresponding site,
    displaying network information of the first and second network sites in three dimensions according to an open software interconnect layer, indicating routing direction with arrows and repositioning objects in the views, and
    conducting exclusively hierarchical network management system communications between said input/output modules and said server module by asking a selected node for the node's routing table of adjacent nodes, and asking each of the adjacent nodes for the adjacent nodes' respective routing tables;

8. The method according to claim 7, wherein hierarchical network management system communications includes communication only incident to an object state change communicated to one of the input/output modules.

9. The method according to claim 7, wherein hierarchical network management system communications includes providing filtered management data being transmitted by one of the input/output modules.

10. The method according to claim 7, wherein hierarchical network management system communications includes providing filtered management data being transmitted to a user interface module.

11. The method according to claim 7, including transmitting management data limited to specified variables to a user interface module for display.

12. The method according to claim 7, including displaying network status and objects according to limitations of subscriber status and variable specification.

13. The method according to claim 7, including assigning objects to be monitored to specific input/output modules.

14. The method according to claim 7, including monitoring device status on a medium connecting the sites, the medium selected from a group consisting of Ethernet, token ring, FDDI (Fiber Distributed Data Interconnect), Ultranet, ATM (Asynchronous Transfer Mode), HiPPI (High Performance Parallel Interface), SONET (Synchronous Optical Network), synchronous transfer serial lines, and a cable link system.

15. A network management system having multiple network sites, comprising:
    at least a single standard network management protocol agent;
    at least a first and a second input/output module respectively at a first and a second site connected to said at least a single standard network management protocol agent, said standard network management protocol and said input/output modules being configured for standard network management protocol communications;
    a server module, connected to said at least first and second input/output modules, said server module and said input/output modules being configured for hierarchical network management system communication by asking a selected node for the node's routing table of adjacent nodes, and asking each of the adjacent nodes for the adjacent nodes' respective routing tables; and
    a user interface module connected to said server module, said user interface module including a three dimensional display of network information from the first and second network sites according to an open software interconnect layer with routing direction being indicated with arrows and objects being repositioned in the views.

16. The method of collecting and displaying network information from multiple network sites with at least a first and a second input/output module respectively at a first and a second site, a server module, and a user interface module, including the steps of:
    collecting network information with a input/output modules,
    providing information limited by object and object variable from the input/output modules to the server module at times of change for object and object variables, providing information limited by object and object variable from server module to user interface module at times of change for object and object variables, asking a selected node for the node's routing table of adjacent nodes, asking each of the adjacent nodes for the adjacent nodes' respective routing tables;

displaying network information in three dimensions according to an open software interconnect layer, indicating routing direction with arrows and repositioning objects in the views, and displaying network information by selected object and object variable.

17. The method according to claim 16, further including organizing displayed network information according to host, subnetwork, and interconnections between host and subnetwork.

18. The method according to claim 16, further including indicating subnetworks as horizontal rows and indicating hosts as vertical columns.

19. The method according to claim 18, further indicating interfaces as dots at the intersection of selected ones of said horizontal rows and vertical columns.

20. The method according to claim 16, further including indicating subnetworks as concentric rings and indicating hosts as radial line segments.

* * * * *